US012572912B2

(12) United States Patent
Kawata et al.

(10) Patent No.: US 12,572,912 B2
(45) Date of Patent: Mar. 10, 2026

(54) UNATTENDED VENDING APPARATUS

(71) Applicant: Toshiba Tec Kabushiki Kaisha, Tokyo (JP)

(72) Inventors: Kento Kawata, Fujisawa Kanagawa (JP); Mayuko Tsunoda, Yokohama Kanagawa (JP); Morito Natsume, Koto Tokyo (JP); Mikio Ito, Ota Tokyo (JP); Taro Ando, Izunokuni Shizuoka (JP); Takahide Matsumoto, Higashimurayama Tokyo (JP); Ai Hirai, Koto Tokyo (JP); Kizuku Inoue, Yokohama Kanagawa (JP); Tsuyoshi Nakai, Nara Nara (JP); Yumiko Okuma, Koganei Tokyo (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 488 days.

(21) Appl. No.: 18/157,203

(22) Filed: Jan. 20, 2023

(65) Prior Publication Data

US 2023/0267792 A1    Aug. 24, 2023

(30) Foreign Application Priority Data

Feb. 22, 2022    (JP) .............................. JP2022-025951

(51) Int. Cl.
| | |
|---|---|
| *G06Q 20/18* | (2012.01) |
| *G07F 9/00* | (2006.01) |
| *G07F 11/62* | (2006.01) |

(52) U.S. Cl.
CPC ............. *G06Q 20/18* (2013.01); *G07F 9/002* (2020.05); *G07F 11/62* (2013.01)

(58) Field of Classification Search
CPC .... G06Q 20/18; G06Q 20/203; G06Q 20/407; G06Q 20/208; G06Q 20/40145;
(Continued)

(56) References Cited

U.S. PATENT DOCUMENTS

| | | | |
|---|---|---|---|
| 2019/0035044 A1* | 1/2019 | Ferguson | ............... G06Q 20/18 |
| 2019/0051083 A1* | 2/2019 | Goldberg | ............... G07F 9/026 |

(Continued)

FOREIGN PATENT DOCUMENTS

| | | |
|---|---|---|
| JP | 2005070839 A | 3/2005 |
| JP | 2006244158 A | 9/2006 |

(Continued)

OTHER PUBLICATIONS

Japanese Office Action dated May 20, 2025, mailed in counterpart Japanese Application No. 2022-025951, 8 pages.

*Primary Examiner* — Timothy R Waggoner
(74) *Attorney, Agent, or Firm* — Kim & Stewart LLP

(57) ABSTRACT

An unattended (automated) vending apparatus includes a communication interface to connect to a server device, a container section for storing items of merchandise to be purchased, and a sensor device to detect a removal or return of an item of merchandise from or to the container section. A first display screen is provided to display information to a user. A second display screen is also provided to display information to the user. A processor is configured to identify the item of merchandise removed from the container section based on output from the sensor device, register the identified item of merchandise on a transaction list, cause the first display screen to display information relating to the registered item, and receive an indication that registration of items has been completed by the user and then display information relating to payment processing on the second display screen.

20 Claims, 30 Drawing Sheets

(58) Field of Classification Search
CPC .......... G07F 9/002; G07F 11/62; G07F 7/025;
G07F 7/06; G07F 9/001; G07F 9/026;
G07F 11/04; G07F 11/06; G07F 11/46;
G07G 1/0036; G07G 1/12
See application file for complete search history.

(56) References Cited

U.S. PATENT DOCUMENTS

| | | | |
|---|---|---|---|
| 2020/0105085 A1* | 4/2020 | Jafa | G06Q 20/18 |
| 2021/0027568 A1 | 1/2021 | Lin | |
| 2021/0065492 A1* | 3/2021 | Rosburg | G06Q 20/18 |
| 2022/0180299 A1* | 6/2022 | Väin | B65G 1/1371 |

FOREIGN PATENT DOCUMENTS

| | | |
|---|---|---|
| JP | 2008087892 A | 4/2008 |
| JP | 2019208627 A | 12/2019 |
| JP | 2020087373 A | 6/2020 |
| JP | 2021117991 A | 8/2021 |
| KR | 101127900 B1 | 3/2012 |
| WO | 2021016326 A1 | 1/2021 |

* cited by examiner

| COMMODITY CODE | COMMODITY INFORMATION | | | | | |
|---|---|---|---|---|---|---|
| | COMMODITY NAME | TYPE | PRICE | WEIGHT | MERCHANDISE ICON | ... |

| RACK ID | MERCHANDISE CODE | QUANTITY | ... |
|---|---|---|---|

1624

| USER ID | MERCHANDISE CODE | QUANTITY | UNIT PRICE | ... |
|---------|------------------|----------|------------|-----|

| ROBOT ID | LOCATION INFORMATION | STATUS INFORMATION | ... |
|----------|----------------------|--------------------|-----|

| ROBOT ID | MERCHANDISE CODE | STOCK QUANTITY | ... |
|----------|------------------|----------------|-----|

| USER ID | USER INFORMATION | | |
| --- | --- | --- | --- |
| | FEATURE INFORMATION | INFORMATION FOR SETTLEMENT | ... |

| TERMINAL ID | CALL DATE AND TIME | CALL POSITION | INFORMATION FOR AUTHENTICATION (PIN CODE) | ROBOT ID | ARRIVAL DATE AND TIME | ... |
| --- | --- | --- | --- | --- | --- | --- |

| TRANSACTION ID | ROBOT ID | USER ID | MERCHANDISE CODE | PAYMENT FLAG | ... |
|---|---|---|---|---|---|

FIG. 16

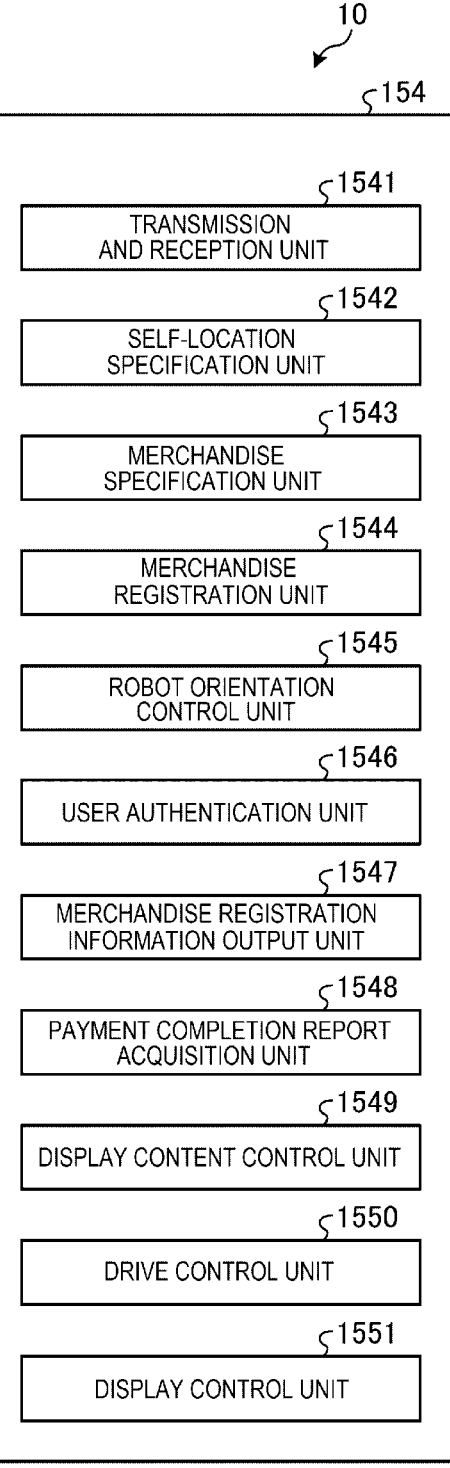

10

154

1541
TRANSMISSION
AND RECEPTION UNIT

1542
SELF-LOCATION
SPECIFICATION UNIT

1543
MERCHANDISE
SPECIFICATION UNIT

1544
MERCHANDISE
REGISTRATION UNIT

1545
ROBOT ORIENTATION
CONTROL UNIT

1546
USER AUTHENTICATION UNIT

1547
MERCHANDISE REGISTRATION
INFORMATION OUTPUT UNIT

1548
PAYMENT COMPLETION REPORT
ACQUISITION UNIT

1549
DISPLAY CONTENT CONTROL UNIT

1550
DRIVE CONTROL UNIT

1551
DISPLAY CONTROL UNIT

*FIG. 22*

FIG. 24
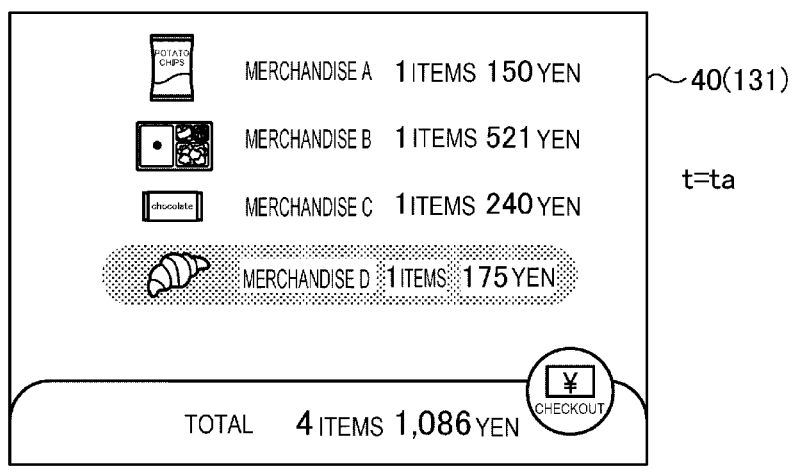
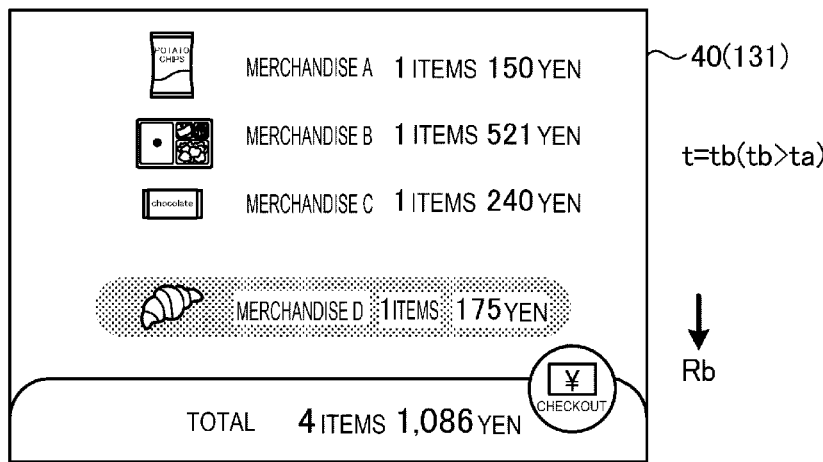
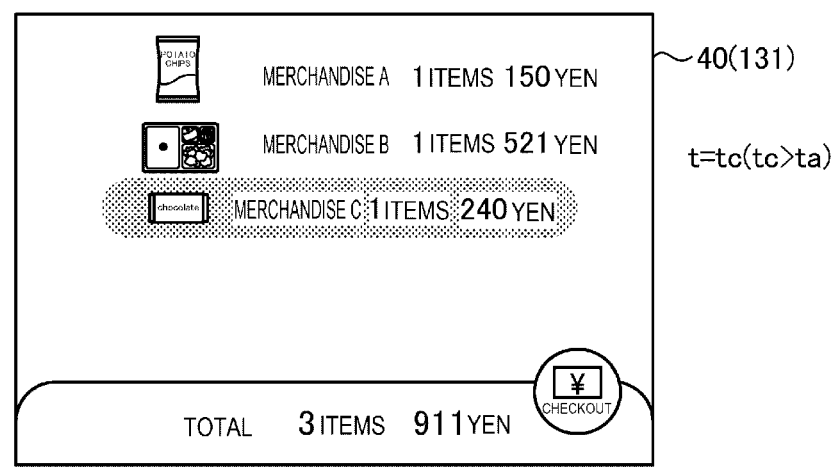

FIG. 25
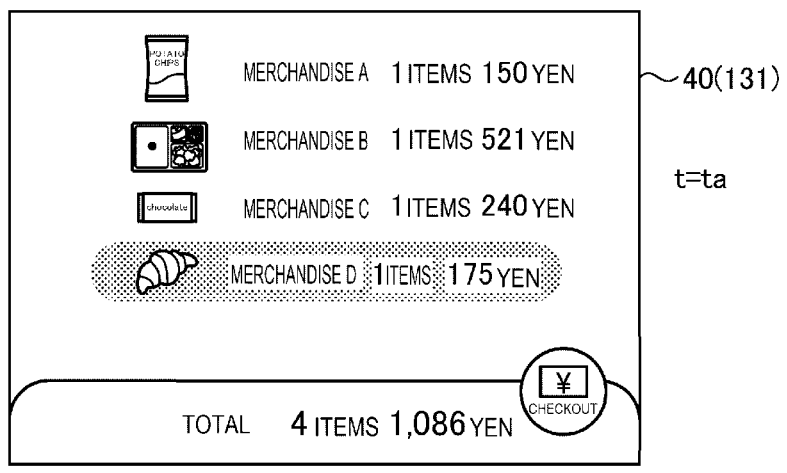
~40(131)
t=ta
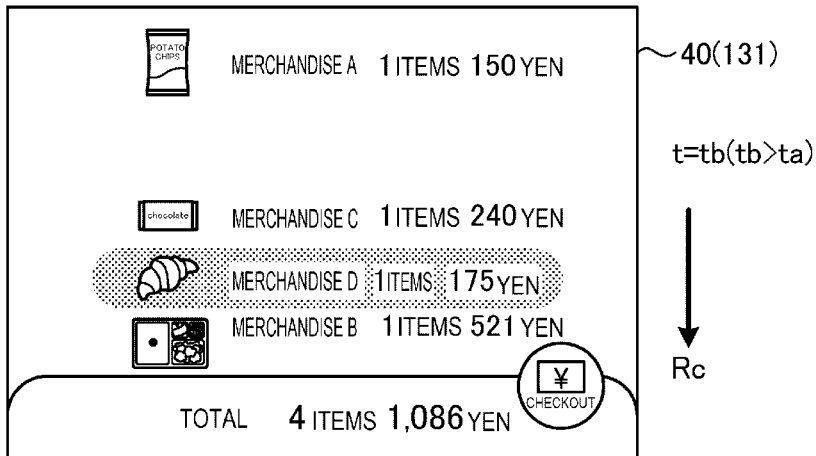
~40(131)
t=tb(tb>ta)
Rc
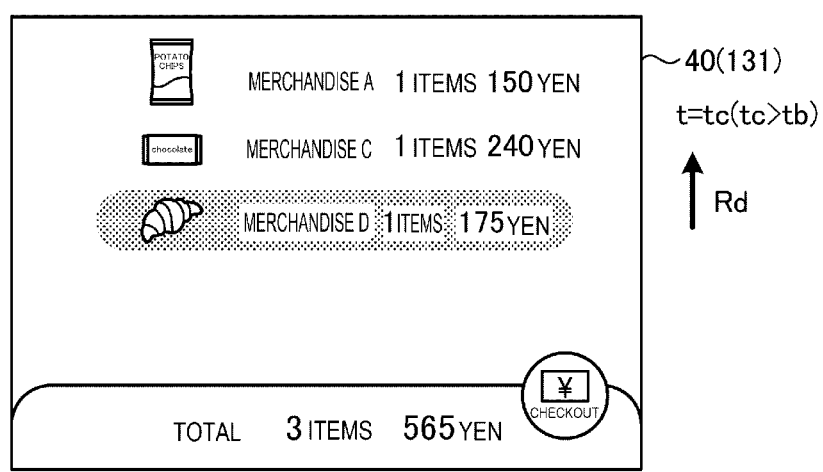
~40(131)
t=tc(tc>tb)
Rd

10

40 (131)

A, 1 ITEM
150YEN

B, 1 ITEM
521YEN

C, 1 ITEM
240YEN

TOTAL 3 ITEMS 911YEN

TOTAL
911YEN IN
PAYMENT

¥
CHECK-
OUT 51 (131)

UNATTENDED VENDING APPARATUS

CROSS-REFERENCE TO RELATED APPLICATION

This application is based upon and claims the benefit of priority from Japanese Patent Application No. 2022-025951, filed on Feb. 22, 2022, the entire contents of which are incorporated herein by reference.

FIELD

Embodiments described herein relate to an unattended vending apparatus such as mobile vending robot or the like.

BACKGROUND

There has been proposed a system including a mobile robot that moves within a retail store and supports shopping of a customer in the store. The robot travels within the store and carries an item to be purchased for the customer around the store and then to a register for checkout or the like.

As described, such a system only assists the customer while shopping inside the store. A more useful system for a business operator who sells merchandise would be desirable.

BRIEF DESCRIPTION OF THE DRAWINGS

FIG. 6 shows an example of a data configuration of a merchandise master.

FIG. 7 shows an example of a data configuration of a contained merchandise table.

FIG. 11 shows an example of a data configuration of a robot management table.

FIG. 12 shows an example of a data configuration of a merchandise management table.

FIG. 13 shows an example of a data configuration of a user management table.

FIG. 14 shows an example of a data configuration of a call management table.

FIG. 15 shows an example of a data configuration of a transaction management table.

FIG. 16 depicts functional aspects of a mobile vending robot.

FIG. 22 shows examples of authentication windows.

FIGS. 24 and 25 show a merchandise registration window at cancelling of merchandise registration.

DETAILED DESCRIPTION

Certain example embodiments provide an automated vending apparatus that may display a registration status of merchandise to be purchased and a progress status of payment processing in an easy-to-understand way.

According to one embodiment, a vending apparatus includes an interface configured to connect to a server device, a container section for storing items of merchandise, and a sensor device configured to detect a removal of an item of merchandise from the container section and a return of the item of merchandise to the container section. A first display screen is provided to display information to a user. A second display screen is also provided to display information to the user. A processor is configured to identify the item of merchandise removed from the container section based on output from the sensor device, register the identified item of merchandise on a transaction list, cause the first display screen to display information relating to the registered item of merchandise, and receive an indication that registration of items has been completed by the user and then display information relating to payment processing on the second display screen.

Certain, non-limiting examples will be explained with reference to the drawings.

(System Configuration of Mobile Vending System)

Figure 1:
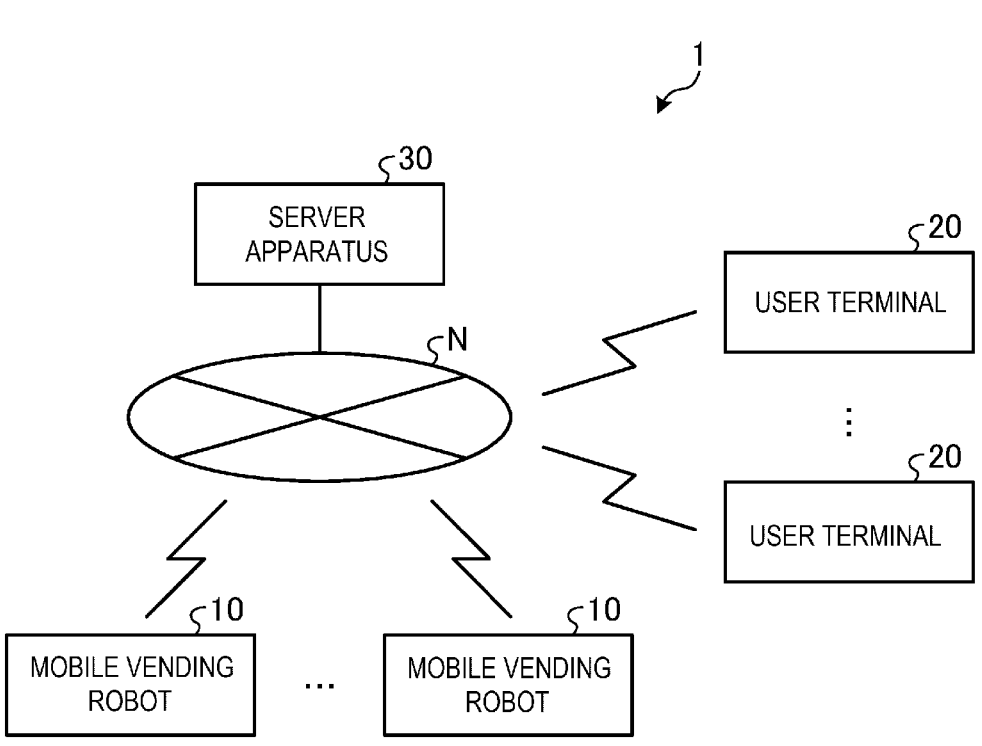
FIG. 1 depicts a mobile vending system according to an embodiment.

A system configuration of a mobile vending system 1 according to an embodiment is explained. FIG. 1 shows an example of a configuration of the mobile vending system 1 according to the present embodiment.

As shown in FIG. 1, the mobile vending system 1 has mobile vending robots 10, user terminals 20, and a server apparatus 30. The mobile vending robots 10, the user terminals 20, and the server apparatus 30 are connected to a network N such as a LAN (Local Area Network).

Each mobile vending robot 10 is an automated guided vehicle (unattended mobile vending apparatus) for carrying and selling merchandise. For example, the mobile vending robot 10 travels within a predetermined range/area in a shopping mall or the like and sells merchandise at various locations within the predetermined range/area. The mobile vending robot 10 may perform circulation (circuit) traveling along a predetermined route and/or call (on-demand) traveling to a call location designated by a customer. Note that any number of the mobile vending robots 10 may be provided.

(Schematic Configuration of Mobile Vending Robot)

Figure 2:
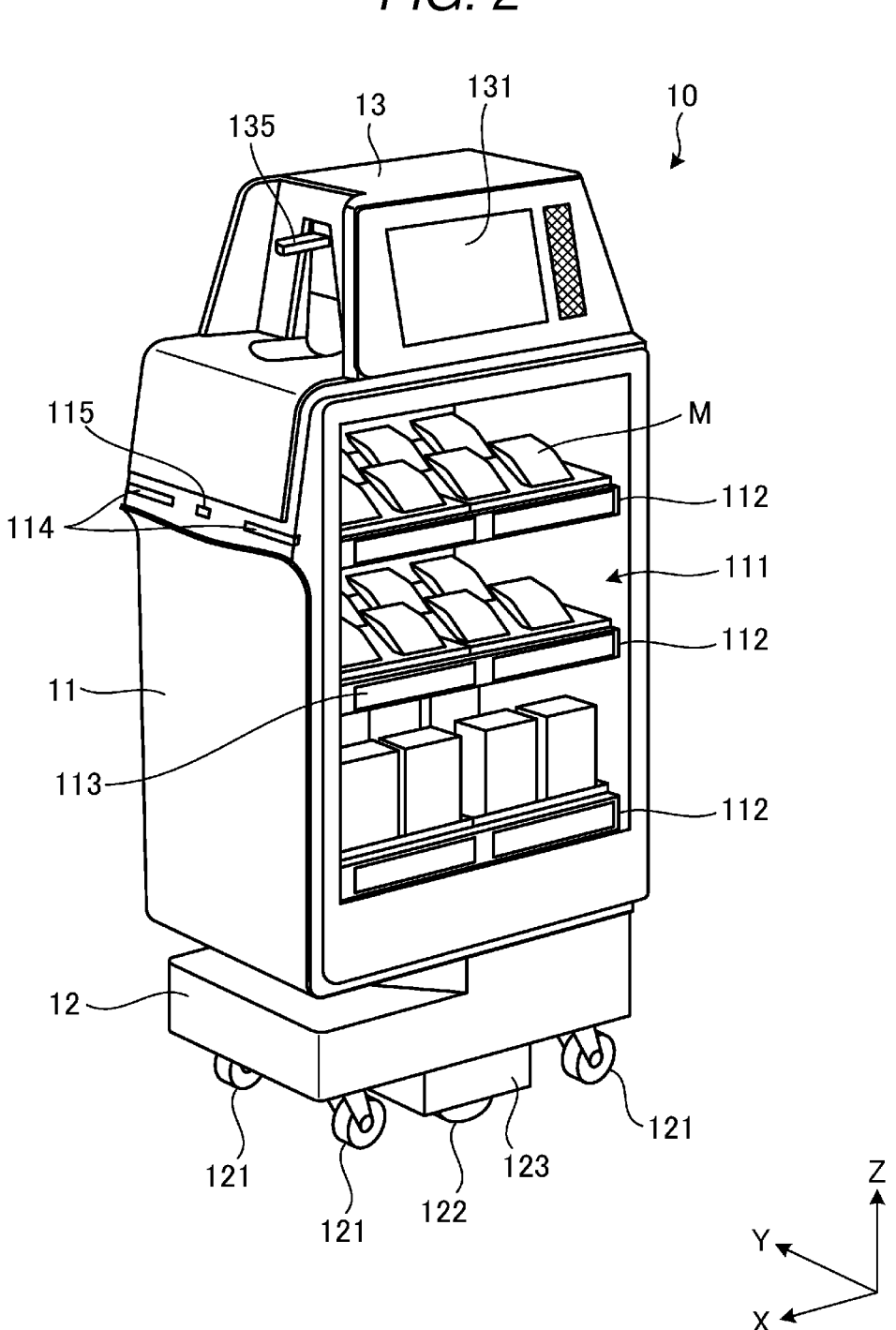
FIGS. 2 to 4 are perspective views of a mobile vending robot.
Figure 3:
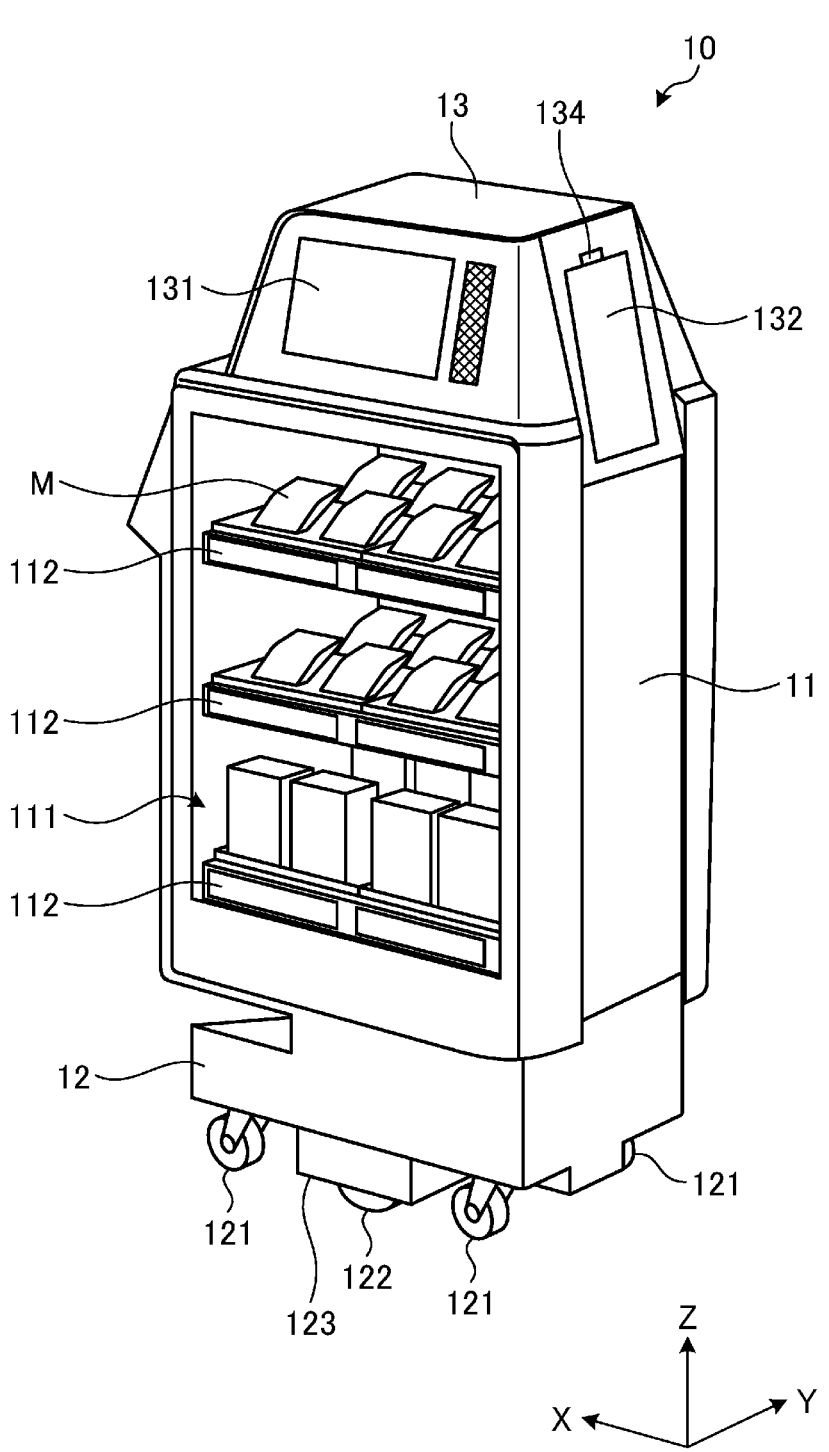
Figure 4:
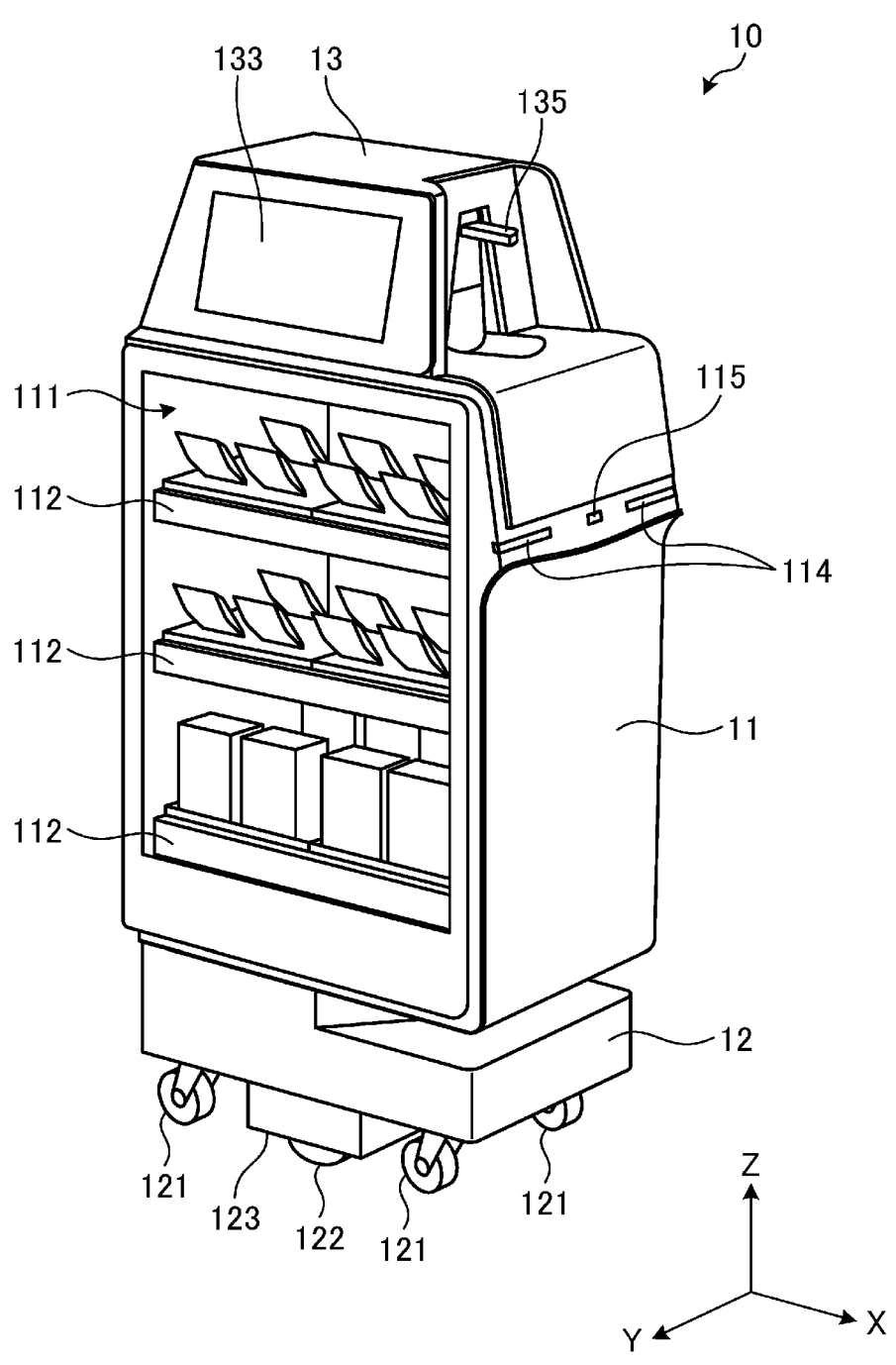

FIG. 2 is a first perspective view showing an example of the mobile vending robot 10. FIG. 3 is a second perspective view of the mobile vending robot 10. FIG. 4 is a third perspective view of the mobile vending robot 10.

In FIGS. 2 to 4, the configuration of the mobile vending robot 10 is described using three axial directions of an X-axis, a Y-axis, and a Z-axis orthogonal to one another.

The mobile vending robot 10 includes a main body part 11, a movement part 12, and a user interface part 13. The main body part 11 is formed in a box-shaped housing open at the front and rear sides. A container section 111 is provided inside of the main body part 11.

The container section 111 is a space for merchandise M such as foods and the like. In the container section 111, a plurality of racks 112 on which the merchandise M can be displayed are placed in upper and lower portions in the front-back direction of the mobile vending robot 10. The merchandise M is mounted on the racks 112 by a clerk who manages the mobile vending robot 10 or the like. The merchandise M contained in the container section 111 is not limited to foods, and in other examples may be merchandise in other categories such as medical products or leisure goods. Alternatively, the container section 111 may contain merchandise M in a plurality of categories.

The racks 112, in some examples, may be sectioned into a plurality of regions for sorting merchandise M. In this case, the racks 112 may be sectioned in the plurality of regions using trays or the like.

Tags 113 for displaying names and prices of the merchandise M are provided on the front side of the racks 112. The tags 113 may be electronic tags or digital signage digitally displaying information. Further, in each of the racks 112, a weight sensing section 159 (see FIG. 5) that can detect the weight of the merchandise M mounted on the rack 112 is provided. The weight sensing section 159 senses a change in weight, and thereby, senses taking out of the merchandise M mounted on the rack 112 from the rack 112 or returning of the merchandise M to the rack 112.

Note that, in the present embodiment, the tags 113 are provided on the front side of the racks 112, however, the tags 113 may be also provided on the rear side of the racks 112. Furthermore, in the present embodiment, both the front side and the rear side of the main body part 11 (container section 111) are open, however, in other examples, only one (e.g., only the front side) may be open.

A door portion formed using a light-transmissive member such as glass is attached to one or both of the front side and the rear side of the main body part 11 (container section 111) for permitting access to the inside of the container section 111 via the door portion. In some examples, a door portion may be attached to the front side of the main body part 11 but the rear of the main body part 11 may be covered by a wall surface. In this case, the wall surface on the rear side may be formed using a light-transmissive member such as glass. Thereby, during the movement of the mobile vending robot 10 or the like, the merchandise M within the container section 111 may be prevented from falling out of the container section 111.

A lockable configuration may be formed by provision of an electronic lock or the like on the door portion. Thus, during movement of the mobile vending robot 10 or the like, the merchandise within the container section 111 may be prevented from being improperly removed.

A light emitting section 114 and a range sensor 115 are provided on the front side of the main body part 11. The light emitting section 114 has a light emitting device such as an LED (Light Emitting Diode) and emits light according to a control instruction by a control section 154 and indicates the operation status of the mobile vending robot 10. For example, the light emitting section 114 emits light during the movement of the mobile vending robot 10, and thereby, informs that the mobile vending robot 10 is moving. Note that the color of the emitted light of the light emitting section 114 is not limited to a single color. For example, the light emitting section 114 may vary the light emission color or change the light emission pattern according to the operation status of the mobile vending robot 10. In some examples, the light emitting section 114 may be provided on the backside of the main body part 11 rather than the front side thereof.

The range sensor 115 is a sensor sensing an object present around the mobile vending robot 10 and measuring a location of the object and a distance to the object. The sensing result of the range sensor 115 is output to the control section 154 to be described later and used for avoiding a collision during the movement of the mobile vending robot 10. The range sensor 115 may be realized by a camera capturing an image, a sensor device sensing an object and measuring a distance using ultrasonic wave, or a sensor device such as a LiDAR (Light Detection and ranging) sensing an object using a laser beam.

Note that the location where the range sensor 115 is provided is not limited to the front portion of the mobile vending robot 10. For example, the range sensor 115 may be in another location such as the back portion of the mobile vending robot 10. An imaging section 134 (see FIG. 3) may be used as the range sensor 115 in some examples.

The movement part 12 is provided on the downside of the main body part 11 and supports the main body part 11 and permits the main body part 11 to move. Specifically, the movement part 12 includes non-drive wheels 121, a drive wheel 122, and a drive section 123 driving the drive wheel 122.

The non-drive wheels 121 are small wheels. The non-drive wheels 121 freely change the directions according to the direction of the force generated by the rotation of the drive wheel 122, and thereby, change the traveling direction of the mobile vending robot 10 (movement part 12).

The drive wheel 122 is rotationally driven by the drive section 123, and thereby, moves the mobile vending robot 10 (movement part 12) forward, backward, or rotates.

The drive section 123 has a drive source such as a motor and a power supply. The drive section 123 rotationally drives the drive wheel 122 according to a control instruction by the control section 154, and thereby, moves the mobile vending robot 10 (movement part 12) in a direction and to a location instructed by the control section 154.

The user interface part 13 is provided on the upside of the main body part 11. The user interface part 13 includes a first display unit 131, a second display unit 132, a third display unit 133, the imaging section 134, and a disinfecting device 135.

The first display unit 131 is a display device placed on the front side of the mobile vending robot 10. The second display unit 132 is a display device placed on the back side of the mobile vending robot 10. The third display unit 133 is a display device placed on the rear side of the mobile vending robot 10. On the first display unit 131, the second display unit 132, and the third display unit 133, various kinds of information relating to merchandise registration processing and payment processing performed when the merchandise M is sold is displayed according to a control instruction by the control section 154. On the first display unit 131, the second display unit 132, and the third display unit 133, various ad windows can be displayed according to a control instruction by the control section 154. Various ad windows display information for advertising the merchandise M contained in the container section 111, information relating to promotion of the merchandise M, business ads, etc.

The imaging section 134 is placed on the back side of the mobile vending robot 10. The imaging section 134 is a digital camera having an imaging device such as a CCD (Charge Coupled Device) or a CMOS (Complementary MOS). The imaging section 134 acquires information necessary for face authentication of a customer by imaging the face of the customer when payment processing is performed.

The disinfecting device 135 is a device that disinfects the customer using the mobile vending robot 10. In the embodiment, disinfection refers to destroy (or remove) pathogenic bacteria, virus, and other microorganisms existing on the object to be harmless. Further, the disinfection can be read as eradication, sterilization, or antisepsis.

The device configuration of the disinfecting device 135 is not particularly limited. For example, the disinfecting device 135 may be an atomizer spraying a disinfectant solution such as alcohol. In some examples, the disinfecting device 135 may be an ultraviolet disinfecting device radiating an ultraviolet ray. The disinfecting device 135 performs a disinfecting action of spraying the disinfectant solution, radiation of the ultraviolet ray, or the like according to an operation by the customer.

Note that the configuration of the user interface part 13 is not limited to the illustrated example. For example, the numbers and the placement positions of the display devices of the user interface part 13 may be varied from those in the illustrated example. In some examples, the user interface part 13 need not include the disinfecting device 135. In some examples, the user interface part 13 may include a reader device for reading information encoded in a code symbol such as a two-dimensional code, a reader device for reading information from a card medium such as an IC card (chip card) or a credit card, or the like.

Returning to FIG. 1, the user terminal 20 is a terminal device used by the user of the mobile vending system 1. The user terminal 20 is realized in this example by a portable terminal device such as a smartphone or a tablet terminal. The user terminal 20 receives a call request to request a call to the mobile vending robot 10 from the customer and transmits the received call request to the server apparatus 30. Any number of the user terminals 20 may be provided.

The server apparatus 30 manages the mobile vending system 1. The server apparatus 30 is realized by an information processing apparatus such as a PC (Personal Computer). The server apparatus 30 tracks the merchandise sold by the respective mobile vending robots 10. Further, the server apparatus 30 controls the mobile vending robots 10 to travel to a call location designated by the call request received from a user terminal 20. For example, the server apparatus 30 tracks the current locations of the mobile vending robots 10 and the user terminals 20 and, when receiving the call request for a mobile vending robot 10 from the user terminal 20, controls the mobile vending robot 10 designated by the call request to travel toward the location of the user terminal 20.

(Hardware Configuration of Mobile Vending Robot)

Figure 5:
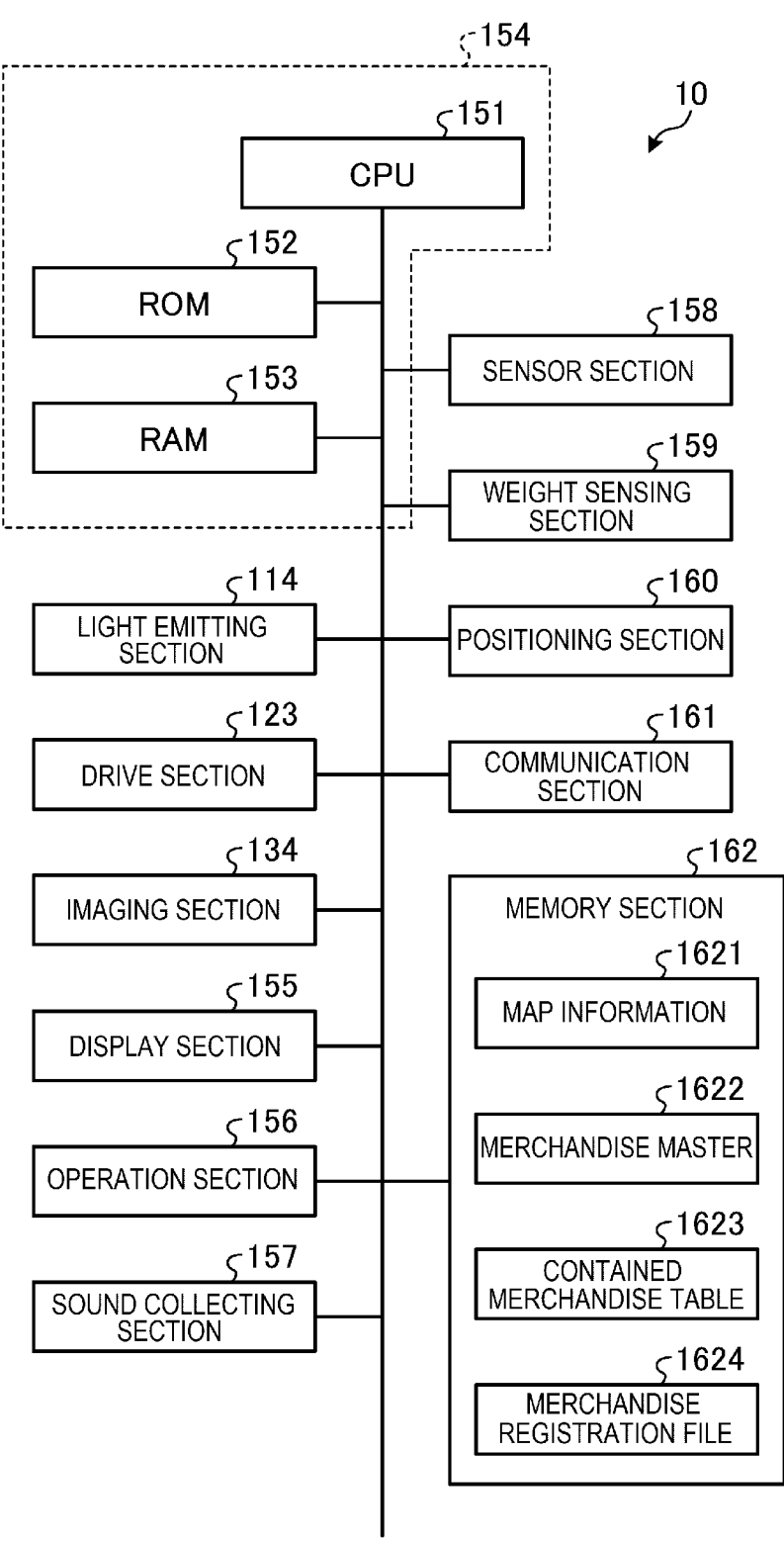
FIG. 5 shows an example of a hardware configuration of a mobile vending robot.
Figure 8:
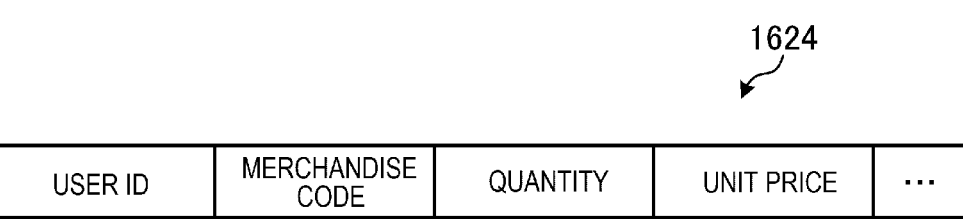
FIG. 8 shows an example of a data configuration of a merchandise registration file.

FIG. 5 shows an example of the hardware configuration of the mobile vending robot. FIG. 6 shows an example of a data configuration of a merchandise master. FIG. 7 shows an example of a data configuration of a contained merchandise table. FIG. 8 shows an example of a data configuration of a merchandise registration file.

As shown in FIG. 5, the mobile vending robot 10 includes the control section 154 (controlling the entire mobile vending robot 10), a memory section 162, and various peripheral devices.

The control section 154 includes a CPU (Central Processing Section) 151, a ROM (Read Only Memory) 152, and a RAM (Random Access Memory) 153. The CPU 151 performs integrated control of the respective sections of the mobile vending robot 10. The ROM 152 stores various programs. The RAM 153 is a work space for loading programs and various kinds of data.

The CPU 151, the ROM 152, and the RAM 153 are connected via a bus or the like. The control section 154 executes various kinds of processing by the CPU 151 operating according to the programs stored in the memory section 162 and loaded in the RAM 153.

The mobile vending robot 10 includes a light emitting section 114, a drive section 123, and an imaging section 134 as various peripheral devices. Furthermore, the mobile vending robot 10 includes a display section 155, an operation section 156, a sound collecting section 157, a sensor section 158, weight sensing sections 159, a positioning section 160, and a communication section 161.

The display section 155 is a display device incorporating the first display unit 131, second display unit 132, and third display unit 133 in this embodiment. The display section 155 comprises LCDs (Liquid Crystal displays) or the like. The display section 155 displays various kinds of information under control by the CPU 151. Note that, if the tags 113 are electronic tags, the display section 155 may also incorporate these electronic tags.

The operation section 156 is an input device such as a keyboard, a pointing device, and the like. The operation section 156 outputs details of an input operation received from the customer to the CPU 151. Note that the operation section 156 may also or instead be a touch panel provided on the display screen of the display section 155.

The sound collecting section 157 collects sound around the mobile vending robot 10 and outputs sound signals to the CPU 151. The sound collecting section 157 is realized by a sound collecting device such as a microphone. The sound collecting section 157 collects sound (e.g., voice commands/requests) for stopping traveling from the customer wishing to purchase merchandise of the mobile vending robot 10 during circulation traveling.

The sensor section 158 is a sensor device such as range sensor 115. The sensor section 158 outputs a sensing result obtained by the sensor device to the CPU 151.

The weight sensing sections 159 are weight sensors for sensing the weights of the items of merchandise contained in the container section 111. Specifically, the weight sensing sections 159 are provided for each of the respective racks 112 and sense the weights and changes in weight of the merchandise mounted on the respective racks 112. Note that the racks 112 are associated with a weight sensing section 159 in advance and, if the weight sensing section 159 senses a change in weight, the rack 112 experiencing the change can be identified.

If the racks 112 are sectioned into a plurality of regions, a weight sensing section 159 may be provided for each of the sectioned regions. In this case, the respective regions and the weight sensing sections 159 are associated with each other.

The positioning section 160 measures the location where the mobile vending robot 10 is present. The positioning section 160 may be realized by a positioning device using a positioning technique of GPS (Global Positioning System) or the like.

The positioning section 160 may be realized by a location measuring device using a positioning technique of beacon positioning, RFID (Radio Frequency Identifier) positioning, or the like. In this case, terminals corresponding to the positioning technique of beacon positioning, RFID, or the like are provided in the respective locations in the travel range in which the mobile vending robot 10 is movable, and the present location of the mobile vending robot 10 may be measured (determined) by a positioning system comprising the beacon/RFID terminals and the positioning section 160.

The communication section 161 is a wireless communication interface connectable to the network N. The communication section 161 makes communications with external apparatuses including the server apparatus 30 via the network N.

The memory section 162 has a memory medium such as an HDD (Hard Disk Drive) or a flash memory and maintains the memory contents even when the power is shut down. The memory section 162 stores programs that can be executed by the CPU 151 and various kinds of setting information.

The memory section 162 stores map information 1621, a merchandise master 1622, a contained merchandise table 1623, and a merchandise registration file 1624. The map information 1621 is information representing a map of the range in which the mobile vending robot 10 moves. The map information 1621 is information correlating the location specified by the positioning section 160 with the location in the range in which the mobile vending robot 10 is movable. The mobile vending robot 10 performs circulation traveling and call traveling according to the specified location in the map information 1621. Note that any format of the map information 1621 may be used.

The merchandise master 1622 is a data table in which information on merchandise to be sold is stored. As shown in FIG. 6, the merchandise master 1622 stores merchandise information of merchandise corresponding to a merchandise code for specification of the merchandise in correlation with the merchandise code. The merchandise information includes a merchandise name, a category, a price, a weight, a merchandise icon, and the like.

In some examples, the memory section 162 might not store the merchandise master 1622. In such a case, the mobile vending robot 10 refers to a merchandise master 3162 (see FIG. 10) stored in the server apparatus 30, and may handle the merchandise master 3162 like the merchandise master 1622.

The contained merchandise table 1623 is a data table for storing information on the merchandise stored in the container section 111. As shown in FIG. 7, the contained merchandise table 1623 correlates the respective racks 112 provided in the container section 111 with identifiable rack IDs and stores the merchandise code of the items of merchandise mounted on the rack 112 with a quantity of the mounted merchandise.

The data configuration of the contained merchandise table 1623 is not limited to the example in FIG. 7. For example, if the racks 112 are sectioned into the plurality of regions, the contained merchandise table 1623 may assign identifiers with respect to each of the sectioned regions and correlate and store the merchandise code of the merchandise mounted in the region with the quantity.

The merchandise registration file 1624 is a file in which the merchandise M taken out by the customer from the rack 112 of the mobile vending robot 10 is registered. As shown in FIG. 8, in the merchandise registration file 1624, by correlation with a user ID for unique identification of the customer, the merchandise code, the quantity, the unit price of the merchandise M taken out by the customer having the user ID from the rack 112 of the mobile vending robot 10 are stored. The data configuration of the merchandise registration file 1624 is not limited to the example in FIG. 8, and in other examples may include information by which the merchandise M taken out from the rack 112 of the mobile vending robot 10 by the customer can be specified.

Here, the user ID may be a PIN code issued by the server apparatus 30 when the customer calls the mobile vending robot 10 or a face image or a user ID of the customer calling the mobile vending robot 10.

The mobile vending robot 10 transmits the merchandise registration file 1624 to the server apparatus 30 when the customer completes all taking out of the merchandise M from the racks 112. Then, the server apparatus 30 performs payment processing based on the registered contents of the merchandise registration file 1624. Note that the mobile vending robot 10 may transmit the merchandise code of the taken out merchandise at each time when the customer takes out the merchandise M from the rack 112 and perform both registration processing and payment processing of the merchandise in the server apparatus 30.

(Hardware Configuration of User Terminal)

Figure 9:
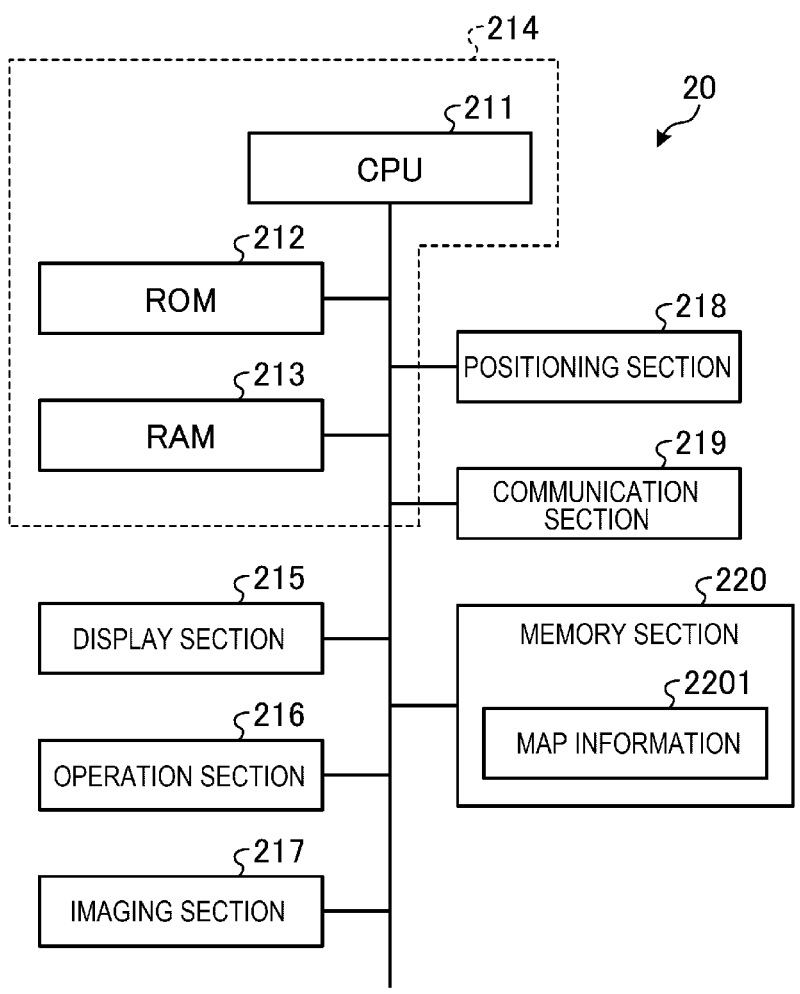
FIG. 9 shows an example of a hardware configuration of a user terminal.

FIG. 9 shows an example of a hardware configuration of the user terminal according to the embodiment.

As shown in FIG. 9, the user terminal 20 includes a control section 214 controlling the entire user terminal 20, a memory section 220, and various peripheral devices.

The control section 214 includes a CPU 211, a ROM 212, and a RAM 213. The CPU 211 performs integrated control of the respective sections of the user terminal 20. The ROM 212 stores various programs. The RAM 213 is a work space for loading programs and various kinds of data.

The CPU 211, the ROM 212, and the RAM 213 are connected via a bus or the like. The control section 214 executes various kinds of processing by the CPU 211 operating according to the programs stored in the memory section 220 and loaded in the RAM 213.

The user terminal 20 includes a display section 215, an operation section 216, an imaging section 217, a positioning section 218, a communication section 219, and the memory section 220.

The display section 215 is a display device including an LCD or the like. The display section 215 displays various kinds of information under control by the CPU 211. The operation section 216 is an input device including a keyboard, a pointing device, etc. The operation section 216 outputs details of operation received from the customer to the CPU 211. Note that the operation section 216 may be a touch panel provided on the display screen of the display section 215.

The imaging section 217 is a digital camera having an imaging device such as a CCD or a CMOS. The imaging section 217 images the customer using the user terminal 20 and acquires a face image of the customer or the like.

The positioning section 218 measures a location where the user terminal 20 is present. The positioning section 218 may be realized by a positioning device using a positioning technique of GPS or the like. Or, the positioning section 218 may be realized by a position measuring device using the positioning technique of beacon positioning, RFID positioning, or the like (such as with positioning section 160).

The communication section 219 is a wireless communication interface connectable to the network N. The communication section 219 makes communications with external apparatuses including the server apparatus 30 via the network N.

The memory section 220 has a storage medium such as an HDD or a flash memory and maintains the memory contents even when the power is shut down. The memory section 220 stores programs (including an application program relating to processing by the mobile vending system 1) that can be executed by the CPU 211 and various kinds of setting information.

The memory section 220 also stores map information 2201 and the like. The map information 2201 is information representing a map of the range in which the mobile vending robot 10 moves. In the map information 2201, the same information as the map information 1621 provided in the mobile vending robot 10 can be stored.

(Configuration of Server Apparatus)

Figure 10:
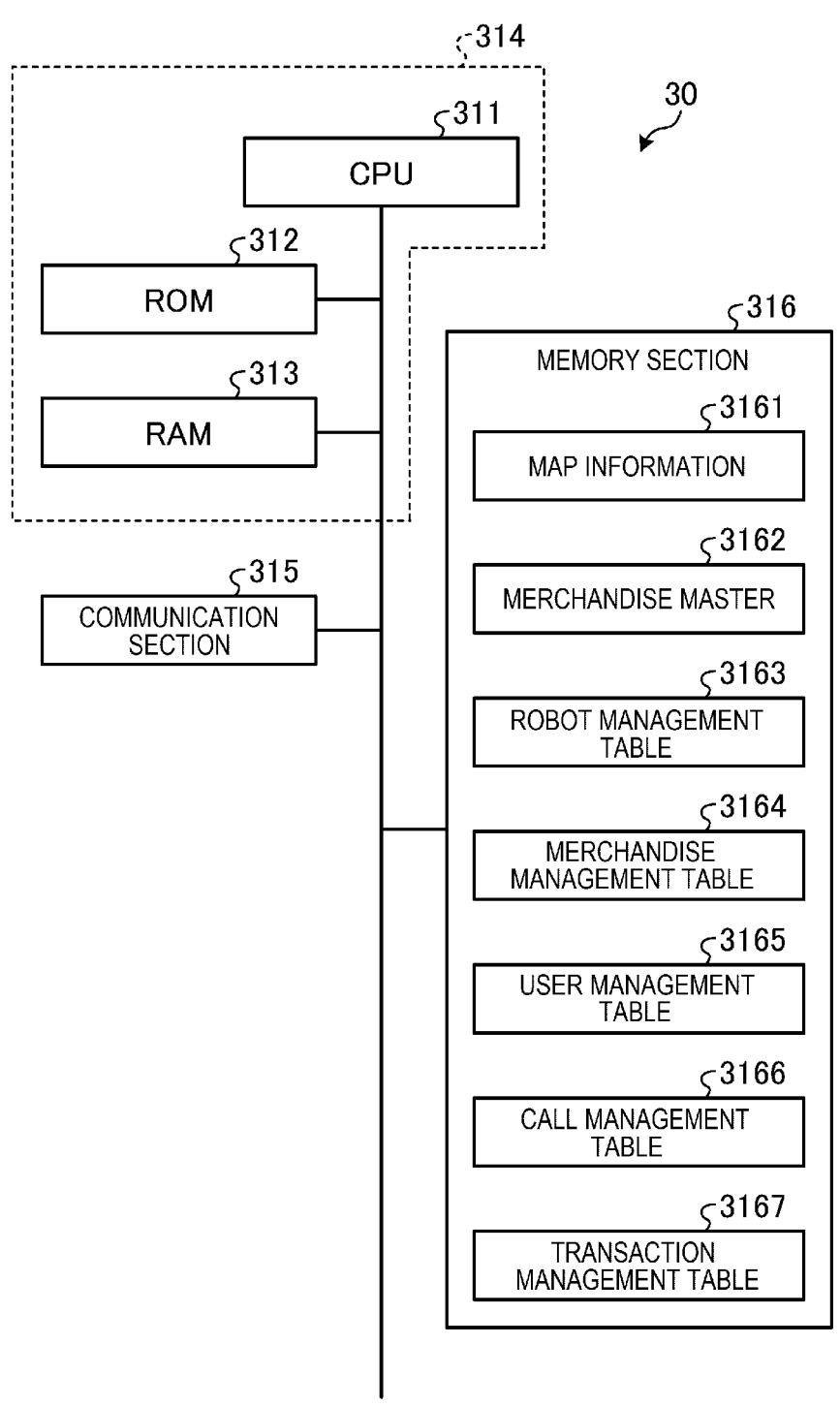
FIG. 10 shows an example of a hardware configuration of a server apparatus.
Figures 11, 12:
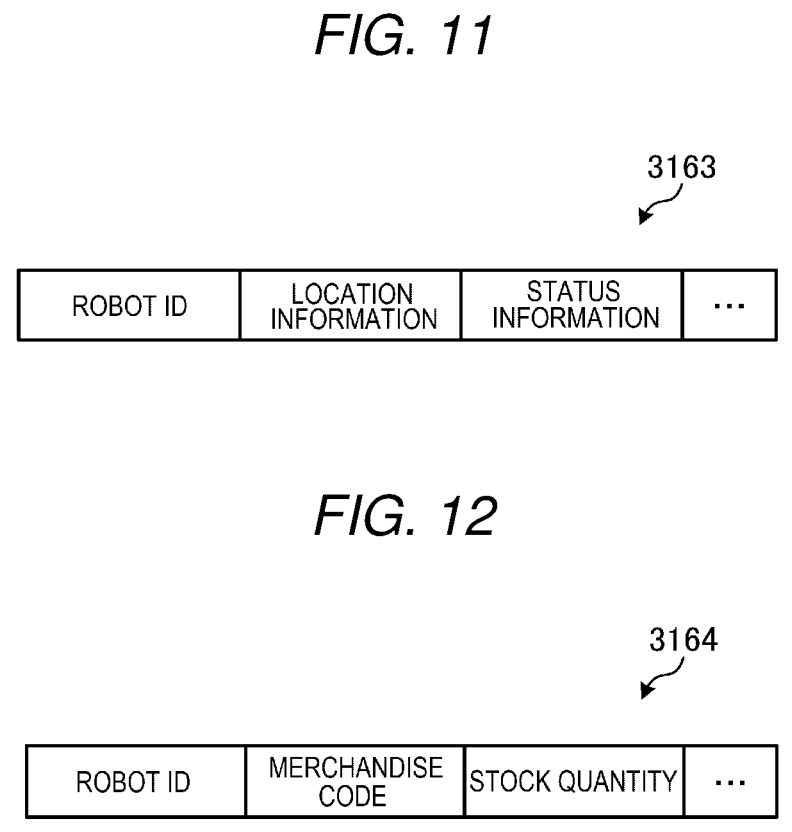
Figure 15:
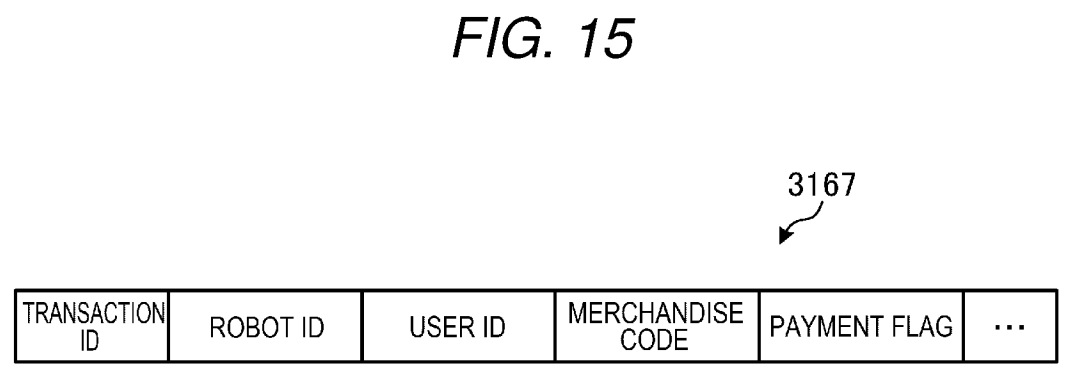

Using FIGS. 10 to 15, a configuration of the server apparatus 30 is explained. FIG. 10 shows an example of the hardware configuration of the server apparatus according to the embodiment. FIG. 11 shows an example of a data configuration of a robot management table. FIG. 12 shows an example of a data configuration of a merchandise management table. FIG. 13 shows an example of a data configuration of a user management table. FIG. 14 shows an example of a data configuration of a call management table. FIG. 15 shows an example of a data configuration of a transaction management table.

As shown in FIG. 10, the server apparatus 30 includes a control section 314 controlling the entire server apparatus 30, a communication section 315, and a memory section 316.

The control section 314 includes a CPU 311, a ROM 312, and a RAM 313. The CPU 311 performs integrated control of the respective sections of the server apparatus 30. The ROM 312 stores various programs. The RAM 313 is a work space for loading programs and various kinds of data.

The CPU 311, the ROM 312, and the RAM 313 are connected via a bus or the like. The control section 314 executes various kinds of processing by the CPU 311 operating according to the programs stored in the memory section 316 and loaded in the RAM 313.

The communication section 315 is a wired or wireless communication interface connectable to the network N. The communication section 315 makes communications with external apparatuses including the mobile vending robot 10 and the user terminal 20 via the network N.

The memory section 316 has a storage medium such as an HDD or a flash memory and maintains the memory contents even when the power is shut down. The memory section 316 stores programs that can be executed by the CPU 311 and various kinds of setting information.

The memory section 316 stores map information 3161 and a merchandise master 3162. The map information 3161 is information representing the map of the range in which the mobile vending robot 10 moves. The map information 3161 stores the same information as the map information 1621 provided in the mobile vending robot 10 and the map information 2201 provided in the user terminal 20. The merchandise master 3162 is a data table in which information on merchandise to be sold is stored. The data configuration of the merchandise master 3162 is the same as that of the merchandise master 1622.

The memory section 316 stores a robot management table 3163, a merchandise management table 3164, a user management table 3165, a call management table 3166, a transaction management table 3167, etc.

The robot management table 3163 is a data table for management of the location and the status of the mobile vending robot 10. As shown in FIG. 11, in the robot management table 3163, by correlation with a robot ID, location information representing the current location of the mobile vending robot 10 corresponding to the robot ID, status information representing the status of the mobile vending robot 10, etc. are stored.

The location information of the mobile vending robot 10 may be expressed by coordinate values of longitude, latitude, or the like. Further, the location information may be expressed by a block number of a plurality of blocks formed by division of the range in which the mobile vending robot 10 is movable or the like.

The status information of the mobile vending robot 10 indicates a potential status such as "moving" (e.g., the mobile vending robot 10 is moving to a destination of a customer call), "waiting for transaction" (the mobile vending robot 10 has arrived at the call destination and is waiting for an operation to start a customer transaction), or "transacting" (the transaction has been started by a customer operation). The status information of the mobile vending robot 10 also may include a "waiting for call" status in which the mobile vending robot 10 can answer a call from the customer during circulation travel or the like, "not available" status in which the mobile vending robot 10 is unable to sell merchandise due to a need for a replenishment of merchandise or the like.

The information stored in the robot management table 3163 is updated according to the location of the mobile vending robot 10 and the status of the mobile vending robot 10 under control by the server apparatus 30.

The merchandise management table 3164 is a data table for management of the merchandise to be sold in each mobile vending robot 10. As shown in FIG. 12, in the merchandise management table 3164, by correlation with the robot ID, the merchandise code of the merchandise sold by the mobile vending robot 10 of the robot ID and the number (remaining number) of the merchandise remaining on the racks 112 of the mobile vending robot 10 are stored.

The information stored in the merchandise management table 3164 is updated according to the number of remaining merchandise held by the mobile vending robot 10 under control by the server apparatus 30.

The user management table 3165 is a data table for management of the customer using the mobile vending system 1. As shown in FIG. 13, in the user management table 3165, by correlation with the user ID by which the customer can be identified, user information on the customer of the user ID is stored.

The user information contains feature information representing features of the face part of the customer, information for payment used for electronic payment, etc. The feature information in this context refers to a face image (facial image) obtained by imaging of the face (or a part thereof) of the customer, feature quantities representing features of the face, or the like and can be used as data for matching in face authentication processing. The information for payment is information including an account for using an electronic payment service contracted by the customer in advance.

The user information is acquired from the customer by a known method of member registration or the like and registered in the user management table 3165. The user ID may be automatically assigned or unique information input by the customer may be used. Note that the possible user information is not limited to the above described examples, and may be or include other information. For example, the user information may contain personal information including a name, age, home address, and the like of the customer.

The user information may also contain the terminal ID, the network address, or the like of the user terminal 20 being used by the customer.

The call management table 3166 is a data table for management of a call for the mobile vending robot 10 by the user terminal 20. As shown in FIG. 14, in the call management table 3166, the terminal ID of the calling user terminal 20, the time and date (call time and date) at which the call is received, the location information representing the location of the call destination (hereinafter, also simply referred to as "call location"), information for authentication used for authentication of the calling customer, the robot ID of the mobile vending robot 10 corresponding to the call, the time and date (arrival time and date) at which the mobile vending robot 10 arrives at the call destination, etc. are correlated and stored.

For the information for authentication, a PIN code including a sequence of numbers, the face image and the user ID of the customer, or the like can be used. In the former case, the PIN code may be issued by the control section 314 or designated by the customer. In the latter case, the control section 314 may use the user ID from the user management table 3165 or the like based on the face image and the user ID transmitted from the user terminal 20 of the calling customer or the transmitted face image. In the embodiment, the control section 314 issues the PIN code when receiving the call and, when the customer makes the payment of the purchased merchandise, the control section 314 performs authentication using the face image of the customer.

The transaction management table 3167 is a data table for management of a transaction via the mobile vending robot 10. As shown in FIG. 15, in the transaction management table 3167, by correlation with a transaction ID for identification of the transaction, the robot ID of the mobile vending robot 10 in which the transaction is performed, the user ID of the customer making the transaction, the merchandise code of the merchandise to be purchased by the customer, a payment flag for determination as to whether or not the payment is made, etc. are stored.

(Functional Configuration of Mobile Vending Robot)

FIG. 16 is a functional block diagram showing an example of the functional aspects of the mobile vending robot 10 according to the present embodiment.

The control section 154 of the mobile vending robot 10 loads and operates the programs in the RAM 153, and thereby, realizes a transmission and reception unit 1541, a self-location specification unit 1542, a merchandise specification unit 1543, a merchandise registration unit 1544, a robot orientation control unit 1545, a user authentication unit 1546, a merchandise registration information output unit 1547, a payment completion report acquisition unit 1548, a display content control unit 1549, a drive control unit 1550, and a display control unit 1551 shown in FIG. 16 as functional units. Note that these respective functions may be implemented by hardware such as a dedicated circuit.

The transmission and reception unit 1541 transmits and receives various kinds of information between the external apparatuses including the server apparatus 30 and itself via the communication section 161. For example, the transmission and reception unit 1541 transmits the location information representing the location of the apparatus itself and the status information to the server apparatus 30 as needed.

The transmission and reception unit 1541 transmits an authentication request to the server apparatus 30 and receives an authentication report from the server apparatus 30. The authentication request is for requesting authentication of the PIN code acquired by the user authentication unit

1546 and contains the PIN code and the robot ID received by the user authentication unit 1546. Furthermore, the transmission and reception unit 1541 transmits a payment request to the server apparatus 30 and receives a payment completion report from the server apparatus 30.

The self-location specification unit 1542 checks the output of the positioning section 160 against the map information 1021, and thereby, identifies the location of the mobile vending robot 10.

The merchandise specification unit 1543 detects the taking out of a merchandise M from the container section 111 (e.g., a particular rack 112) containing the merchandise and the returning of the merchandise M to the container section 111 (the rack 112). The merchandise specification unit 1543 identifies the merchandise M removed from the container section 111 (rack 112) or returned to the container section 111 (rack 112). Specifically, the merchandise specification unit 1543 detects the taking out and returning of merchandise M based on an amount of the change in weight sensed by the weight sensing sections 159. The merchandise specification unit 1543 identifies a particular merchandise M by checking the amount of the change in weight sensed by the weight sensing sections 159 against the weight registered in the merchandise master 1622 for the different items of merchandise M.

The merchandise registration unit 1544 registers the merchandise M identified as removed from the container section 111 in the merchandise registration file 1624. The merchandise registration unit 1544 deletes any merchandise M identified as returned to the container section 111 from the merchandise registration file 1624.

The robot orientation control unit 1545 turns the mobile vending robot 10 by 90° without a shift in location when the registration of the merchandise purchased by the customer is completed. Thereby, the robot orientation control unit 1545 changes the display section 155 facing the customer from the first display unit 131 to the second display unit 132. The first display unit 131 displays a merchandise registration window (see FIG. 21) showing the registered contents of the merchandise and the second display unit 132 displays an authentication window (see FIG. 22) for supporting payment processing. Accordingly, the customer faces the window showing the details of the processing being performed, and thereby, may easily and reliably confirm the status of the processing being performed.

The user authentication unit 1546 receives input information based the operation of the operation section 156. For example, the user authentication unit 1546 receives the PIN code input by the operation by the customer. Further, the user authentication unit 1546 transmits face image data of the customer captured by the imaging section 134 to the server apparatus 30 for user authentication.

The merchandise registration information output unit 1547 transmits the merchandise registration file 1624 to the server apparatus 30 after all of the registrations of the purchased merchandise are completed.

The payment completion report acquisition unit 1548 acquires the payment completion report showing that the payment processing is completed from the server apparatus 30.

The display content control unit 1549 controls the display section 155 to generate display contents displayed on the first display unit 131, the second display unit 132, and the third display unit 133.

The drive control unit 1550 controls the drive section 123 to travel or stop the mobile vending robot 10. The mobile vending robot 10 performs circulation traveling to travel in the predetermined route and call traveling toward the call location designated by the customer under control by the drive control unit 1550.

Further, when the remaining number of some item (or all items) contained in the container section 111 reaches zero, the drive control unit 1550 controls the mobile vending robot 10 to move to a backyard (maintenance yard) for replenishment of the merchandise as necessary.

The display control unit 1551 controls the display section 155 to display the display content generated by the display content control unit 1549 on the display section 155. For example, the display control unit 1551 displays information relating to the merchandise registered by the merchandise registration unit 1544 aligned in rows on the first display unit 131. Further, the display control unit 1551 receives an indication that the merchandise registration is completed and displays information relating to the payment processing on the second display unit 132. Furthermore, if the tags 113 are the electronic tags, the display control unit 1551 controls display of the electronic tags. Note that the display control unit 1551 is an example of a registration result display unit and a payment processing supporting unit in the present disclosure.

(Functional Configuration of Server Apparatus)

Figure 17:
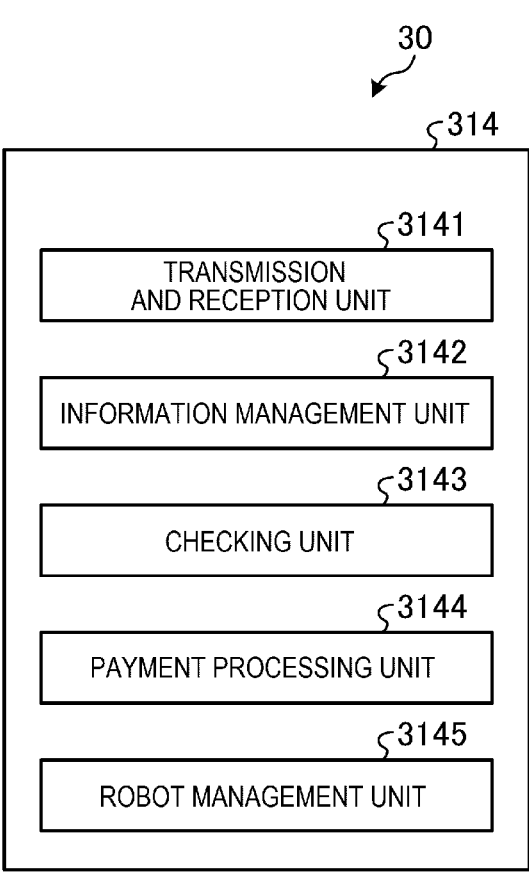
FIG. 17 depicts functional aspects of a server apparatus.

FIG. 17 is a functional block diagram showing an example of the functional aspects of the server apparatus 30 according to the present embodiment.

The control section 314 of the server apparatus 30 loads and operates the programs in the RAM 313, and thereby, realizes a transmission and reception unit 3141, an information management unit 3142, a checking unit 3143, a payment processing unit 3144, and a robot management unit 3145 shown in FIG. 17 as functional units. Note that these respective functions may be implemented as hardware such as a dedicated circuit.

The transmission and reception unit 3141 transmits and receives various kinds of information between the external apparatuses including the user terminal 20 and the respective mobile vending robots 10 and itself via the communication section 315. For example, the transmission and reception unit 3141 receives the location information representing the locations of the mobile vending robots 10 and the status information representing the statuses of the mobile vending robots 10 from the respective mobile vending robots 10. Further, the transmission and reception unit 3141 transmits the location information and the status information of the mobile vending robots 10 to the user terminal 20. Furthermore, the transmission and reception unit 3141 receives a merchandise information request from the user terminal 20 and transmits merchandise information corresponding to the merchandise information request to the user terminal 20.

The transmission and reception unit 3141 receives the call request from the user terminal 20 and transmits a movement instruction to the mobile vending robot 10 identified by the robot ID contained in the call request. The movement instruction is for instructing the mobile vending robot 10 to move to the call location contained in the call request from the user terminal 20. The movement instruction contains information of the terminal ID of the user terminal 20 transmitting the call request, the call location, and the like.

Further, the transmission and reception unit 3141 receives an arrival report from the mobile vending robot 10 and transmits the arrival report to the user terminal 20 that sent the call request for the mobile vending robot 10. The arrival report shows the arrival of the mobile vending robot 10 at the designated call location. The arrival report contains information of the robot ID of the mobile vending robot arriving at the call location.

The transmission and reception unit 3141 transmits the PIN code (information for authentication) to the user terminal 20 in response to the call request and then receives the PIN code input to the mobile vending robot 10 by the customer from the mobile vending robot 10. After the checking unit 3143 identifies the PIN code transmitted to the user terminal 20 with the PIN code input to the mobile vending robot 10, the transmission and reception unit 3141 transmits an authentication report to the mobile vending robot 10. The authentication report shows a match between the customer calling the mobile vending robot 10 and the customer to start shopping by the mobile vending robot 10.

In addition, the transmission and reception unit 3141 receives the payment request from the mobile vending robot 10 and, if the payment processing is performed in response to the payment request, transmits the payment completion report to the mobile vending robot 10. Further, the transmission and reception unit 3141 transmits payment information representing the details of payment to the user terminal 20. The payment request is for requesting the payment processing of the charge of the merchandise purchased by the customer using the mobile vending robot 10. The payment request contains information necessary for the payment processing executed in the server apparatus 30. The information necessary for the payment processing is the face image data of the customer for customer authentication and the merchandise registration file 1624 of the merchandise purchased by the customer. Further, the payment request may contain information relating to a payment method for credit-card payment or electronic-money payment. The payment completion report shows that the payment in response to the payment request is completed. The payment completion report contains information including the transaction ID for identification of the settled transaction. The payment information is information representing the details of the payment relating to the purchase of the merchandise contained in the mobile vending robot 10.

The information management unit 3142 manages a setting sequence of the movement destinations of the mobile vending robots 10. Specifically, the information management unit 3142 moves the mobile vending robots 10 to the call locations in the order of the call requests at the earlier times and dates with respect to the call requests for which the arrival times and dates are not registered in the call management table 3166.

The checking unit 3143 checks whether or not the customer calling the mobile vending robot 10 and the customer to start shopping using the mobile vending robot 10 are the same. Specifically, when the transmission and reception unit 3141 receives the call request from the user terminal 20, the checking unit 3143 issues a PIN code correlated with the call request. Then, the checking unit 3143 checks whether or not the PIN code received from the mobile vending robot 10 and the issued PIN code are the same.

In some examples, the checking unit 3143 may check the customer calling the mobile vending robot 10 against the customer at the start of shopping at the mobile vending robot 10 by face authentication. In this case, the transmission and reception unit 3141 receives the face image data from the mobile vending robot 10. Then, the checking unit 3143 checks matching based on the feature quantities of the received face image data and the feature quantities of the face part of the customer by reference to the user management table 3165. The matching check of the customer calling the mobile vending robot 10 against the customer at the start of shopping at the mobile vending robot 10 is not necessarily essential. In other words, the server apparatus 30 does not necessarily have to incorporate or otherwise provide the function of the checking unit 3143. For example, the system may be configured so that any customer (including one who did not make a call request) can stop (e.g., by a voice request/command or otherwise) the moving mobile vending robot 10 to purchase merchandise.

The payment processing unit 3144 executes the payment processing relating to the payment request received by the transmission and reception unit 3141 from the mobile vending robot 10. In the embodiment, the payment processing unit 3144 executes electronic payment processing by face authentication. The payment processing unit 3144 makes a payment between a payment service provider and itself based on the merchandise registration file 1624 acquired by the transmission and reception unit 3141 from the mobile vending robot 10 if the face image data of the customer received from the mobile vending robot 10 is authenticated in the checking unit 3143. The payment processing unit 3144 executes the payment processing by communication with a payment server of the payment service provider. In some examples, the payment processing unit 3144 may accept an electronic payment by credit-card payment or two-dimensional code payment.

In some examples, the mobile vending robot 10 may have or incorporate some or all of the respective functions of transmission and reception unit 3141, information management unit 3142, checking unit 3143, and payment processing unit 3144. In this case, the user terminal 20 transmits and receives various kinds of information to and from the mobile vending robot 10.

The robot management unit 3145 sets a transmission destination to which the transmission and reception unit 3141 transmits information and transmission contents based on the call request from the user terminal 20, the location information and the status information from the respective mobile vending robots 10, etc. When the transmission and reception unit 3141 receives the call request from the user terminal 20, the robot management unit 3145 sets the mobile vending robot 10 corresponding to the robot ID contained in the call request as the transmission destination of the movement instruction and sets the call location contained in the call request as the transmission content. The robot management unit 3145 checks the status information of the respective mobile vending robots 10 stored in the robot management table 3163 and selects the mobile vending robot 10 corresponding to the call request from the mobile vending robots 10 presently in the status "waiting for call".

In addition, the robot management unit 3145 sets the user terminal 20 which sent the call request as a transmission destination, and calculates a time required for the selected mobile vending robot 10 to arrive at the call location and indicates the estimated time until arrival to the user terminal 20. The estimated time is calculated based on the pending number of call requests (for which arrival times and dates are not yet registered) to the corresponding mobile vending robots 10 registered in the call management table 3166, a preset purchasing limit time for single transaction, the location information and the status information of the corresponding mobile vending robots 10 registered in the robot management table 3163, and the like.

The robot management unit 3145 sends the mobile vending robot 10 for which some or all of the contained merchandise items has reached a zero stock level a movement instruction with reference to the merchandise management table 3164, and sets the location where the merchandise is replenished as the movement destination for the mobile vending robot 10.

(Functional Configuration of User Terminal)

Figure 18:
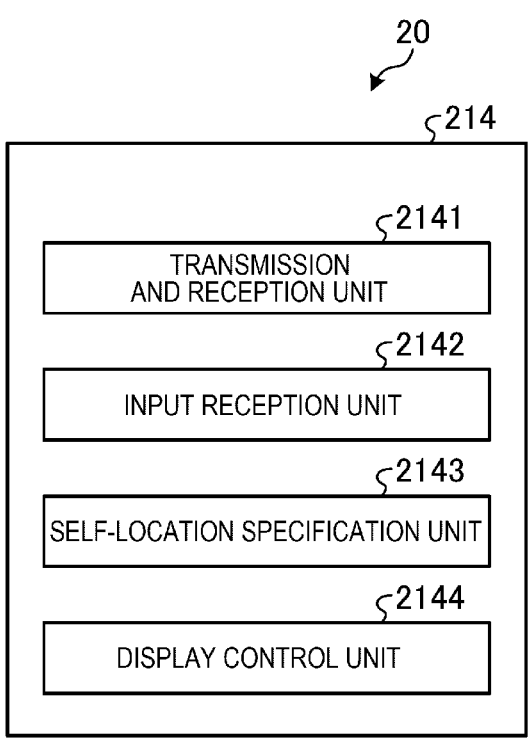
FIG. 18 depicts functional aspects of a user terminal.

FIG. 18 is a block diagram depicting functional aspects of the configuration of the user terminal 20 according to the present embodiment.

The control section 214 of the user terminal 20 loads and operates the programs in the RAM 213, and thereby, realizes a transmission and reception unit 2141, an input reception unit 2142, a self-location specification unit 2143, and a display control unit 2144 shown in FIG. 18 as functional units. Note that these respective functions may be implemented as hardware such as a dedicated circuit.

The transmission and reception unit 2141 transmits and receives various kinds of information between the external apparatuses including the server apparatus 30 and itself via the communication section 219. For example, the transmission and reception unit 2141 receives the robot ID, the current location, the status information, etc. of the mobile vending robot 10 from the server apparatus 30. Further, the transmission and reception unit 2141 transmits the merchandise information request, the call request, and the like to the server apparatus 30.

The merchandise information request is for designating a mobile vending robot 10 and requesting information of the merchandise available from the mobile vending robot 10. The merchandise information request includes the terminal ID of the requesting user terminal 20, the robot ID of the designated mobile vending robot 10, and the like. The call request is for designating a mobile vending robot 10 and requesting a call for the designated mobile vending robot 10.

The call request indicates the terminal ID of the requesting user terminal 20, the robot ID of the designated mobile vending robot 10, and the location information (call location) representing the location of the call destination. If the customer designates information for authentication, the call request further contains the designated information for authentication. Note that, in the present embodiment, the call location is the location of the user terminal 20 when the call is made as determined positioned by the positioning section 218, however, in other examples, a call location other than the present location of the user terminal 20 may be designated by the customer.

The transmission and reception unit 2141 receives the merchandise information transmitted in response to the merchandise information request by the server apparatus 30. Further, the transmission and reception unit 2141 receives the PIN code issued in correlation with the call request by the server apparatus 30. The PIN code is information for authentication for authentication (checking) as to whether or not the customer calling the mobile vending robot 10 and the customer to start shopping using the mobile vending robot 10 are the same.

Furthermore, the transmission and reception unit 2141 receives the arrival report and the payment information report from the server apparatus 30. The arrival report shows the arrival of the mobile vending robot 10 at the call location designated by the call request. The payment information report is information representing the details of the payment relating to the purchase of the merchandise contained in the mobile vending robot 10.

The input reception unit 2142 receives input information based on the operation of the operation section 216. For example, the input reception unit 2142 receives the merchandise information request and the call request from the operation section 216.

The self-location specification unit 2143 provides the location of the user terminal 20 within an area represented by the map information 2201 based on the output of the positioning section 218.

The display control unit 2144 controls the display section 215 to display various kinds of information. Specifically, the display control unit 2144 controls the display section 215 to display various windows (GUI: Graphical User Interface) for supporting the purchase of the merchandise sold by the mobile vending robot 10. For example, the display control unit 2144 controls the display section 215 to display the display window for supporting the call for the mobile vending robot 10. The display control unit 2144 controls the display section 215 to display the payment information representing the details of payment.

(Information Display Examples on User Terminal)

Figure 19:
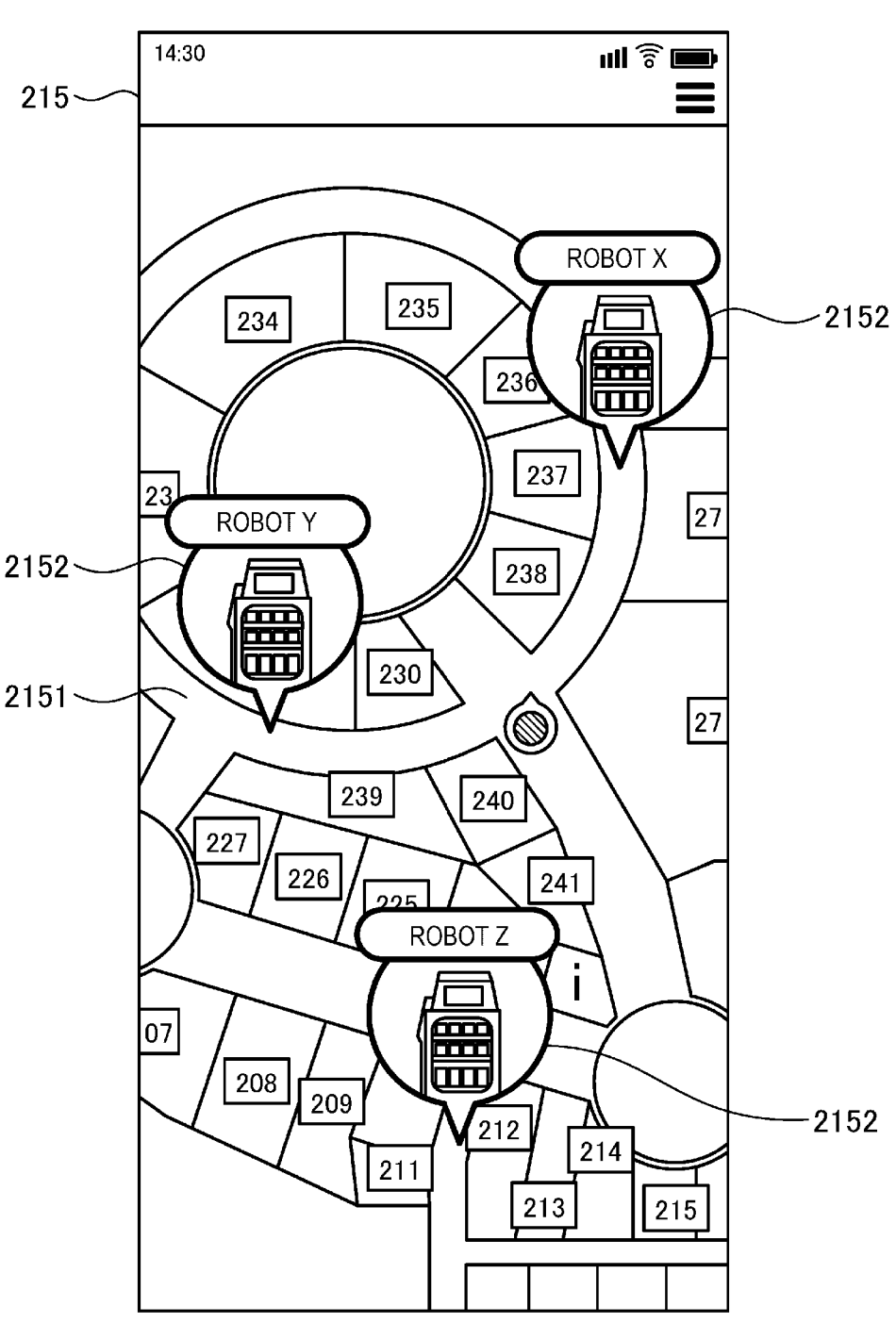
FIG. 19 shows an example of a current location display window displayed on a user terminal.
Figure 20:
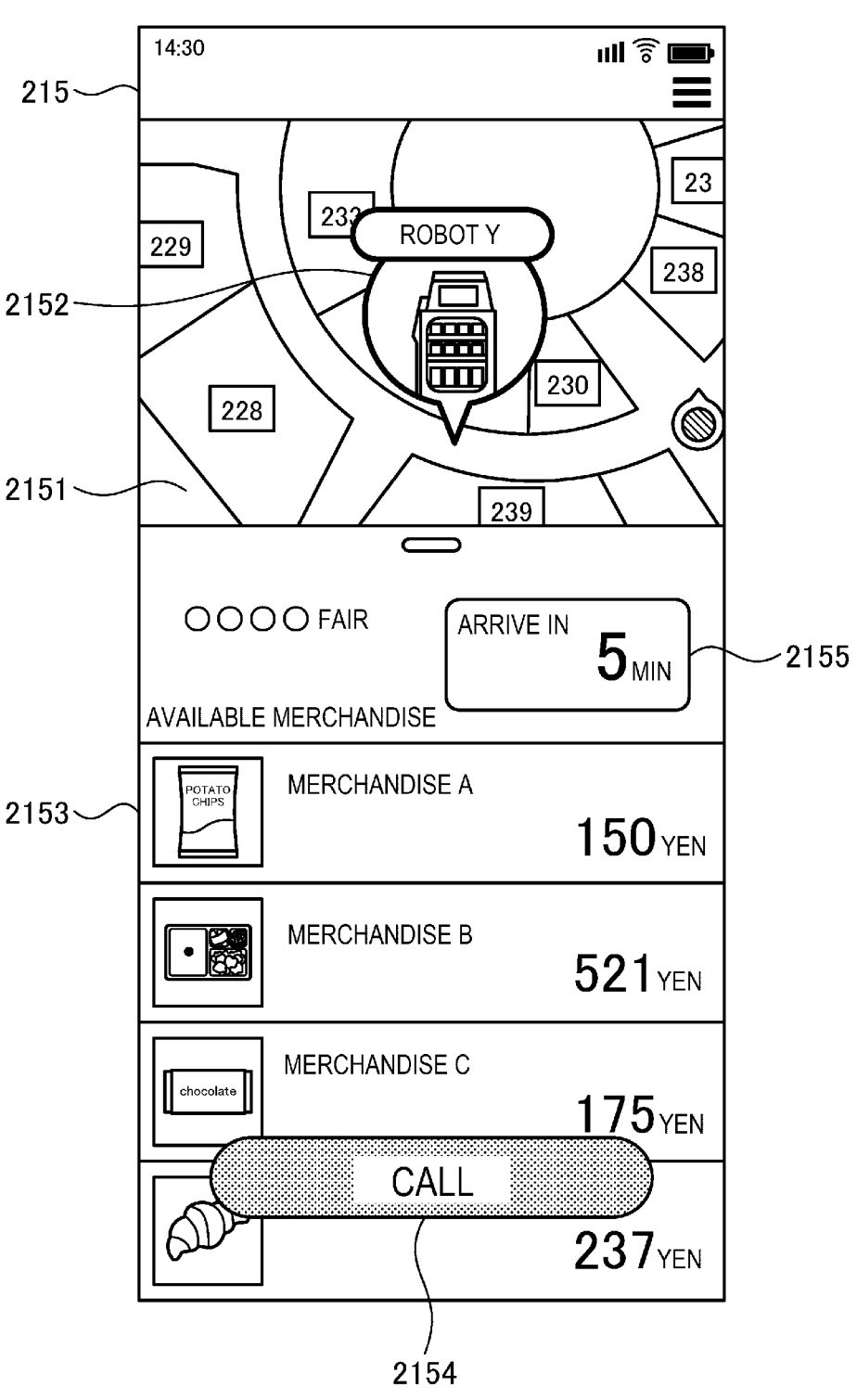
FIG. 20 shows an example of a call window.

FIG. 19 shows an example of a current location display window displayed on user terminal 20. FIG. 20 shows an example of a call window displayed on user terminal 20.

When a merchandise information request menu is selected from a menu select window or the like on the user terminal 20, the display control unit 2144 displays a current location display window of the mobile vending robots 10 shown in FIG. 19. In the current location display window of the mobile vending robots 10, robot marks 2152 showing the current locations of the respective mobile vending robots 10 in a map display area 2151 are displayed.

The respective robot marks 2152 are drawn in sizes that the customer can press down (select). The customer presses down one robot mark 2152 for checking the contents of the contained merchandise of the selected mobile vending robot 10.

The call window shown in FIG. 20 contains a merchandise list 2153 listing the items of merchandise contained in the mobile vending robot 10 corresponding to the selected robot mark 2152, a time required for arrival 2155, and a call button 2154. Note that the map display area 2151 around the selected robot mark 2152 is enlarged and displayed in the upper part of the call window.

The merchandise list 2153 is a list showing merchandise information of the merchandise presently mounted on the mobile vending robot 10. The display control unit 2144 displays the merchandise information transmitted from the server apparatus 30 in a list form according to the selected mobile vending robot 10. Specifically, the display control unit 2144 displays the merchandise information aligned in rows for each merchandise item. The displayed merchandise information includes the merchandise icon, the merchandise name, the price, etc. The merchandise list 2153 is scrollable in the upward and downward directions and the display control unit 2144 updates the displayed merchandise information according to the scroll operation by the customer. Thereby, the merchandise list 2153 can display the merchandise information of all merchandise contained in the selected mobile vending robot 10.

The time required for arrival 2155 is a time from when the selected mobile vending robot 10 is called until the selected mobile vending robot 10 arrives at the location of the user terminal 20.

The robot management unit 3145 of the server apparatus 30 estimates the time required for arrival 2155 by the transmission and reception unit 2141 of the user terminal 20 transmitting the location information provided by the self-location specification unit 2143 to the server apparatus 30. Then, the transmission and reception unit 2141 acquires the estimated required time from the server apparatus 30. Note that the time required for arrival 2155 can be estimated regardless of presence or absence of other call requests for the selected mobile vending robot 10.

The call button 2154 is a button for issuing the call request to the selected mobile vending robot 10. The customer checks the merchandise contained in the mobile vending robot 10 selected in the current location display window in the call window and, if there is merchandise that the customer wishes to purchase, may call the corresponding mobile vending robot 10 by touching the call button 2154.

Note that a display window of merchandise information of the merchandise contained in the mobile vending robot 10 and a window for selection from the mobile vending robot 10 by merchandise name or merchandise category can be displayed in the display section 215 of the user terminal 20.

(Windows Displayed in Display Section of Mobile Vending Robot)

Figure 21:
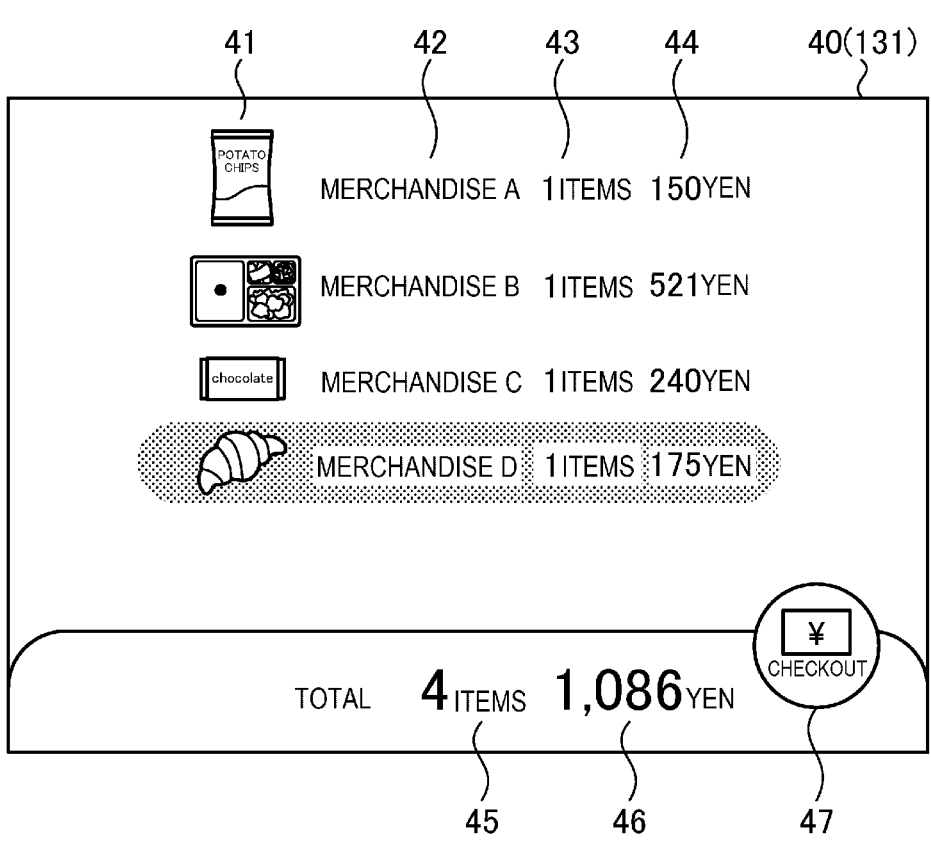
FIG. 21 shows an example of a merchandise registration window.
Figure 22:
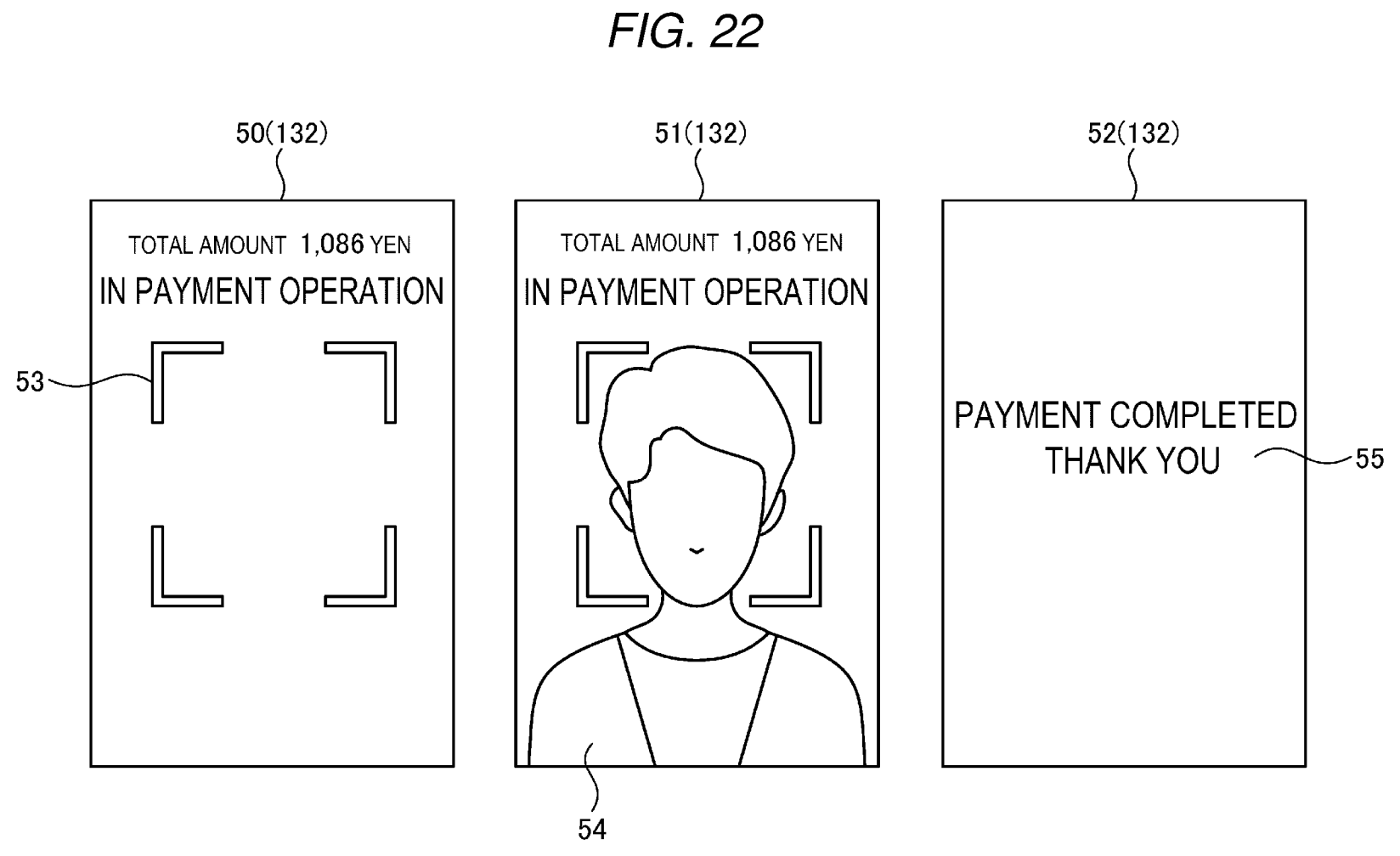

FIG. 21 shows an example of the merchandise registration window. FIG. 22 shows an example of the authentication windows.

As shown in FIG. 21, in the merchandise registration window 40, information specifying the merchandise M taken out from the container section 111 by the customer such as merchandise icons 41, merchandise names 42, numbers of registered merchandise items 43, and subtotals 44 are displayed in rows.

The merchandise icon 41 is an image indicating a merchandise M.

The merchandise name 42 is a name of the merchandise M.

The number of registered merchandise items 43 shows the number of items of the merchandise M that have been removed by the customer.

The subtotal 44 shows a subtotal amount for each merchandise M type.

The display control unit 1551 displays the registered merchandise items sequentially from the top of the merchandise registration window 40 aligned in rows. Here, the most newly registered merchandise (merchandise D in FIG. 21) is displayed with hatching on the merchandise icon 41, the merchandise name 42, the number of registered merchandise items 43, and the subtotal 44. Thereby, the customer may promptly confirm the latest registration information. Further, when the customer returns the merchandise taken out from the container section 111 to the container section 111, the display control unit 1551 deletes the information relating to the merchandise from the merchandise registration window 40. The display format for the display control unit 1551 to display the information relating to the registered merchandise in the merchandise registration window 40 and the display format to delete the information relating to the merchandise returned to the container section 111 from the merchandise registration window 40 will be described later (see FIGS. 23, 24, 25).

The display control unit 1551 respectively displays the merchandise icons 41, the merchandise names 42, the number of registered merchandise items 43, and the subtotals 44 on the display section 155 based on the information relating to the merchandise M provided by the merchandise specification unit 1543.

As shown in FIG. 21, in the merchandise registration window 40, a total number of items 45, a total amount 46, and a registration complete button 47 (payment instruction button) are displayed.

The total number of items 45 is a total number of items that have been registered. The total number of items 45 is a summed total of registered merchandise items 43.

The total amount 46 is a total amount due for the registered merchandise. The total amount 46 is sum of the subtotals 44 for each merchandise.

The registration complete button 47 is a button that the customer presses down when all of the merchandise to be purchased has been removed from the container section 111. When the registration complete button 47 is pressed, the merchandise registration unit 1544 ends the merchandise registration processing. The registration complete button 47 sends an instruction to proceed to the payment processing when pressed.

In the authentication windows 50, 51, 52 displayed on the second display unit 132, as shown in FIG. 22, information according to the progress of the payment processing is displayed.

When the merchandise registration is completed, the display control unit 1551 displays information representing the total amount, information representing being in payment, and an image frame 53 in the authentication window 50. The image frame 53 shows an area where the face of the customer captured by the imaging section 134 is to appear when the server apparatus 30 performs face authentication of the customer for a payment.

The display control unit 1551 displays the authentication window 51 on which an image 54 of the customer captured by the imaging section 134 is superimposed. The customer adjusts the position of the face so that the position of the face of the customer appearing in the authentication window 51 may fit inside of the image frame 53.

The mobile vending robot 10 transmits the captured face image to the server apparatus 30. The server apparatus 30 performs face authentication on the face image acquired from the mobile vending robot 10. If the face authentication is successful, the server apparatus 30 performs the payment processing, then transmits the payment completion report showing that the payment has been completed to the mobile vending robot 10. When the mobile vending robot 10 acquires the payment completion report from the server apparatus 30, the display control unit 1551 displays the authentication window 52 showing a message 55 that the payment is completed.

(Display Format of Merchandise Registration Window at Merchandise Registration)

Figure 23:
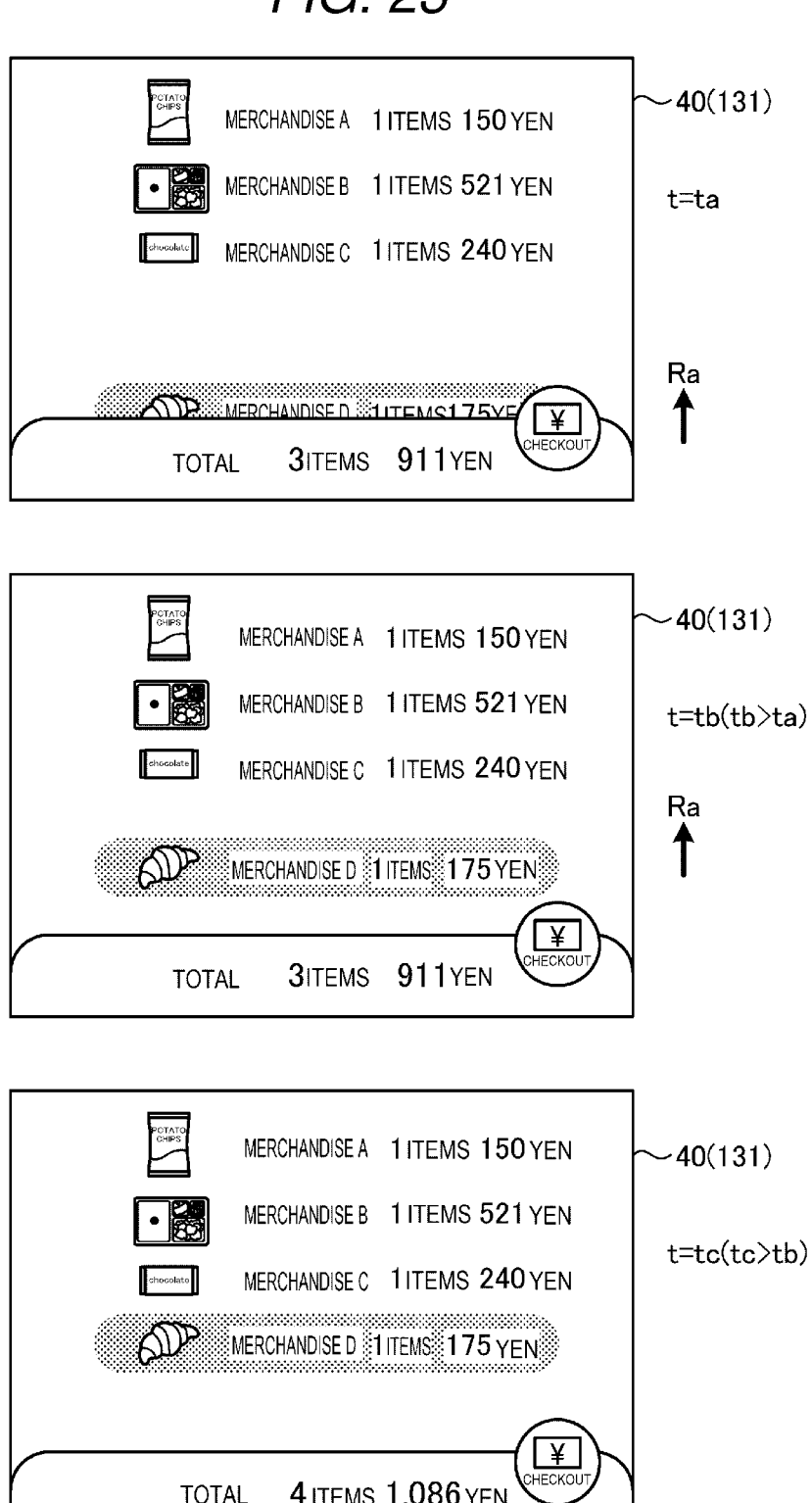
FIG. 23 shows an example of a display format of a merchandise registration window at merchandise registration.

Using FIG. 23, a display format of the merchandise registration window 40 displayed when the mobile vending robot 10 performs merchandise registration processing is explained. FIG. 23 shows an example of a display format of the merchandise registration window at merchandise registration.

A case where the customer takes out a merchandise D from the container section 111 of the mobile vending robot 10 is explained. Here, the merchandise specification unit 1543 identifies the removal of merchandise D from the rack 112 of the container section 111. Then, the display control unit 1551 adds the merchandise D to the merchandise registration window 40.

Here, the display control unit 1551 "wipes in" information relating to the merchandise D from the lower end of the merchandise registration window 40. That is, as shown at time t=ta in FIG. 23, the display control unit 1551 causes the information relating to the merchandise D to appear from the lower end of the merchandise registration window 40 and move in a direction of the arrow Ra.

Then, at time t=tb (tb>ta), the display control unit 1551 moves the information relating to the merchandise D in the direction of the arrow Ra towards the final position on the merchandise registration window 40.

At time t=tc (tc>tb), the alignment of the information relating to the merchandise D in the displayed rows of information in the merchandise registration window 40 is completed. Concurrently with this "wipe in" process, the display control unit 1551 updates the total number of items and the total amount for the merchandise displayed in the lower part of the merchandise registration window 40 to values reflecting the addition of the merchandise D to the registered list. Note that the total number of items and the total amount of the merchandise are set when the merchandise D is taken out from the rack 112 of the container section 111, however, the display of the total number of items and the total amount of the merchandise can be updated when the information relating to the merchandise D is "wiped in" to the merchandise registration window 40 and the row alignment is completed, and thereby, the customer may be reliably informed about the update of the total number of items and the total amount of the merchandise. In some examples, the total number of items and the total amount of the merchandise may be immediately updated whenever the merchandise D is taken out from the rack 112.

Note that it is desirable that the direction in which the information relating to the merchandise D is "wiped in" is set to a direction corresponding to the positional relationship between the container section 111 and the merchandise registration window 40. In the case of the present embodiment, the merchandise registration window 40 is located above the container section 111, and the information relating to the merchandise D is thus "wiped in" upward from the lower end of the merchandise registration window 40 for properly representing that the merchandise D taken out from the container section 111 below the merchandise window 40 is being added to the merchandise registration window 40 (which is above the container section 111). Similarly, if the merchandise registration window 40 were located on the left of the container section 111, it would be desirable that the information relating to merchandise D to be "wiped in" leftward from the right edge of the merchandise registration window 40. Or, if the merchandise registration window 40 were located on the right of the container section 111, it would be desirable that the information relating to merchandise D to be "wiped in" rightward from the left edge of the merchandise registration window 40.

In some examples, the customer may have to bend over to remove merchandise from the container section 111 (or some parts thereof) and it may thus be hard for the customer to see the merchandise registration window 40 at the precise moment merchandise is being removed from the container section 111. Accordingly, the display control unit 1551 may "wipe in" the information relating to merchandise D into the merchandise registration window 40 after some predetermined time elapses after the detection of the removal of the merchandise D from the container section 111.

(Display Format of Merchandise Registration Window at Cancelling of a Merchandise Registration)

Using FIGS. 24 and 25, the display format of the merchandise registration window 40 when the customer cancels the registration of an item of merchandise previously registered is explained. FIG. 24 is a first view showing an example of the display format of the merchandise registration window at cancelling of merchandise registration. FIG. 25 is a second view showing an example of the display format of the merchandise registration window at cancelling of merchandise registration.

First, using FIG. 24, a case where the customer returns a previously registered merchandise D to the container section 111 is explained. Here, the merchandise specification unit 1543 identifies the returning of the merchandise D to the rack 112 of the container section 111. Then, the display control unit 1551 then deletes the information related to merchandise D from the merchandise registration window 40.

Concurrently, the display control unit 1551 "wipes out" the information relating to the merchandise D towards the lower edge of the merchandise registration window 40. That is, as shown at the time t=tb (tb>ta) in FIG. 24, the display control unit 1551 begins to move the information relating to the merchandise D from the initial display position at the time t=ta in a direction of the arrow Rb.

At time t=tc (tc>tb), the information relating to the merchandise D is "wiped out" from the lower edge of the merchandise registration window 40. Then, the display control unit 1551 updates the total number of items and the total amount of the merchandise displayed in the lower part of the merchandise registration window 40 to values reflecting the subtraction of the information relating to the merchandise D. The display control unit 1551 deletes the information relating to the merchandise D and highlights information relating to merchandise C now displayed at the lower end position of the merchandise registration list. Note that the total number of items and the total amount of the merchandise are settled when the merchandise D is returned to the rack 112 of the container section 111, however, the displayed total number of items and the total amount of the merchandise can be updated when the information relating to the merchandise D is "wiped out" (removed) from the merchandise registration window 40, and thereby, the customer may be reliably informed about the update of the total number of items and the total amount of the merchandise. In some examples, the total number of items and the total amount of the merchandise may be immediately updated whenever the merchandise D is returned to the rack 112 of the container section 111.

Note that it is desirable that the direction in which the information relating to the merchandise D is "wiped out" is set to a direction corresponding to the position relationship between the container section 111 and the merchandise registration window 40. In the case of the present embodiment, the merchandise registration window 40 is located above the container section 111, and the information relating to the merchandise D is thus "wiped out" downward to the lower edge of the merchandise registration window 40. Similarly, if the merchandise registration window 40 was located on the left of the container section 111, it would be desirable that the information be "wiped out" rightward at the right edge of the merchandise registration window 40. Or, if the merchandise registration window 40 was located on the right of the container section 111, it would be desirable that the information be "wiped out" leftward at the left edge of the merchandise registration window 40.

The customer may bend over for returning merchandise to the container section 111 and thus be unable to easily see the merchandise registration window 40 during the return of the merchandise. Accordingly, the display control unit 1551 may "wipe out" the information relating to the returned merchandise D from the merchandise registration window 40 after a predetermined time elapses after the merchandise D has been returned to the container section 111.

Next, using FIG. 25, a case where the customer returns the previously registered item (merchandise B, an item in the middle of the merchandise registration list) to the container section 111 of the mobile vending robot 10 is explained. Here, the merchandise specification unit 1543 identifies the returning of the merchandise B to the rack 112 of the container section 111. Then, the display control unit 1551 deletes the merchandise B from the merchandise registration window 40.

Concurrently, the display control unit 1551 "wipes out" the information relating to the merchandise B at the lower edge of the merchandise registration window 40. That is, as shown at the time t=tb (tb>ta) in FIG. 25, the display control unit 1551 moves the information relating to the merchandise B from the display position at the time t=ta in a direction of the arrow Rc. Concurrently, the information relating to the merchandise B moves in the direction of the arrow Rc to be behind the information relating to the merchandise C and the information relating to the merchandise D already registered.

At the time t=tc (tc>tb), the information relating to the merchandise B is "wiped out" at the lower edge of the merchandise registration window 40. Then, as shown at the time t=tc in FIG. 25, the display control unit 1551 moves the information relating to merchandise C and merchandise D in a direction of the arrow Rd and thus fills the row left empty because the information relating to the merchandise B was removed. Concurrently, the display control unit 1551 updates the total number of items and the total amount of the merchandise displayed in the lower part of the merchandise registration window 40 to values reflecting the subtraction of the information relating to the merchandise B. Note that the total number of items and the total amount of the merchandise are settled when the merchandise B is returned to the rack 112, however, the total number of items and the total amount of the merchandise can be updated when the information relating to the merchandise B is "wiped out" from the merchandise registration window 40, and thereby, the customer may be reliably informed about the update of the total number of items and the total amount of the merchandise. In other examples, the total number of items and the total amount for the merchandise may be updated immediately whenever the merchandise B is returned to the rack 112 of the container section 111.

Note that it is desirable that the direction in which the information relating to the merchandise B is "wiped out" is set to a direction corresponding to the position relationship between the container section 111 and the merchandise registration window 40. The display control unit 1551 may wipe out the information relating to the returned merchandise B from the merchandise registration window 40 after a predetermined time elapses after the merchandise B is returned to the container section 111.

(Window Transition of Merchandise Registration Window)

Figure 26:
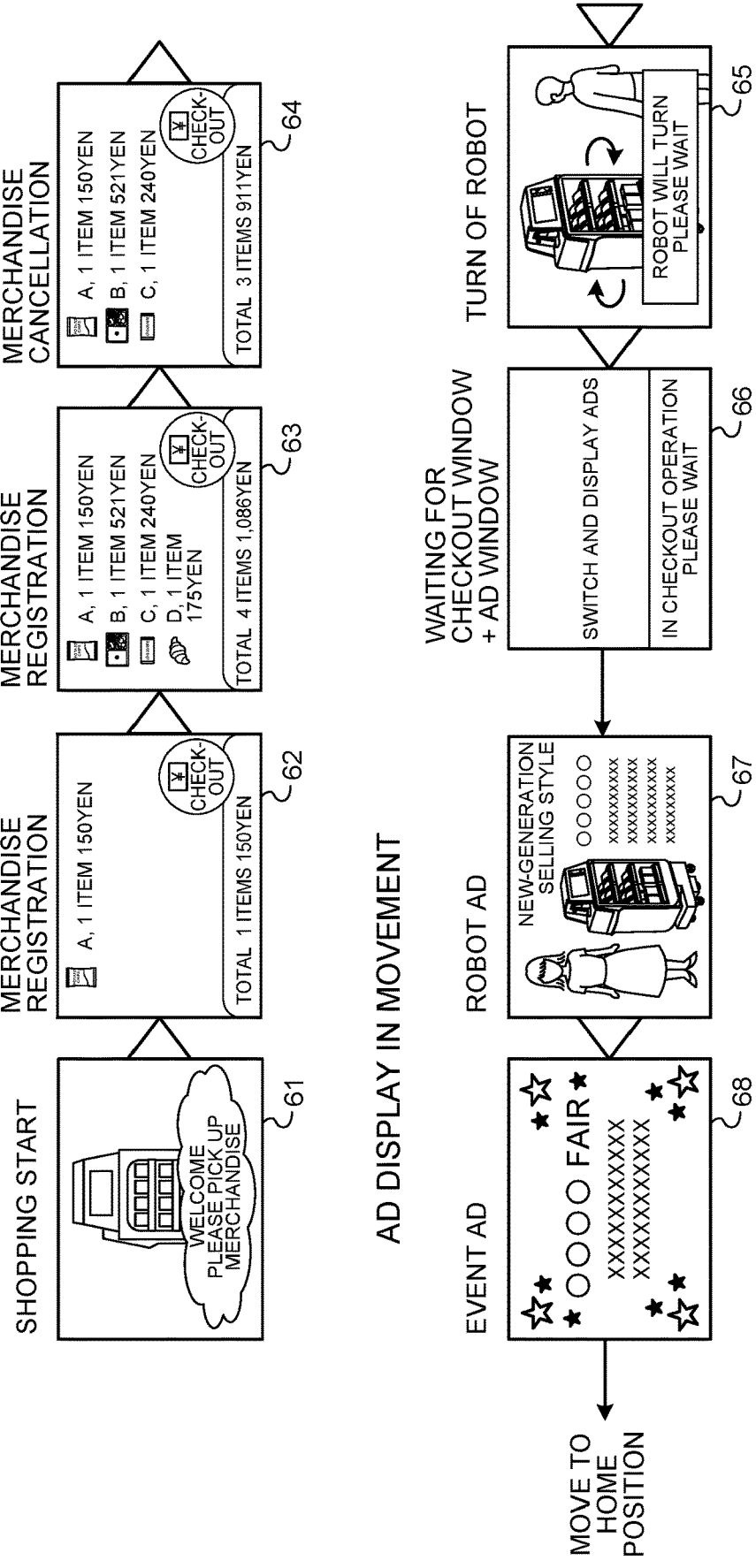
FIG. 26 shows an example of a window transition on a first display unit of a mobile vending robot.

FIG. 26 shows an example of the transition of the screens displayed on the first display unit of the mobile vending robot according to the present embodiment.

A window 61 is a screen displayed when the mobile vending robot 10 arrives at the location of the customer making the call request. The window 61 announces to the customer that shopping can be started.

The window 62 and the window 63 are screens displayed when the customer takes out merchandise M from the container section 111 of the mobile vending robot 10. The window 64 is a screen displayed when the customer returns a previously removed merchandise M to the container section 111 of the mobile vending robot 10.

The window 65 is a screen displayed when the customer presses the registration complete button 47 (see FIG. 21). The window 65 shows that the mobile vending robot 10 turns around without a shift in location (e.g., turns about a fixed axis), and thereby, the second display unit 132 showing the progress of the payment processing now faces the customer in place of the first display unit 131 previously facing the customer.

The window 66 is an example of a screen displayed on the first display unit 131 during the payment processing. Concurrently, various ad windows can be displayed in the upper part of the screen of the first display unit 131.

The window 67 and the window 68 are examples of various ad windows displayed on the first display unit 131 or the third display unit 133 when the mobile vending robot 10 finishes selling of the merchandise to the customer making the call request and, for example, returns to a home position. The ad displays may be an ad relating to the mobile vending robot 10 (window 67), an ad relating to an event being held (window 68), and/or general business ads or the like. For example, the display content control unit 1549 of the mobile vending robot 10 determines when and what ad is displayed based on factors such as the present time and date, the present location, the details of a store event, or the like.

(Flow of Processing by Mobile Vending System)

Figure 27A:
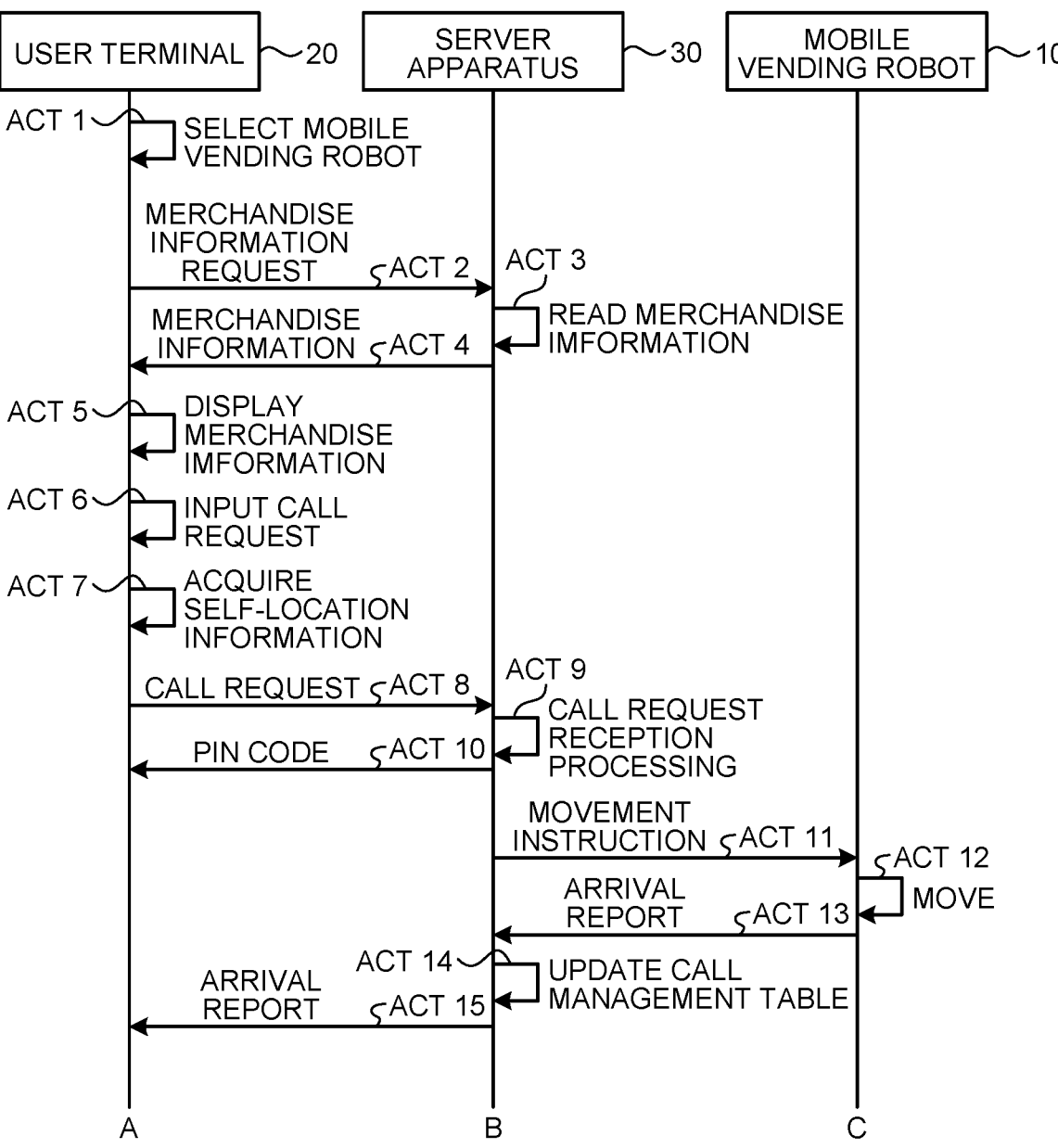
FIGS. 27A and 27B are portions of a sequence chart showing an example of a flow of processing performed by a mobile vending system.
Figure 27B:
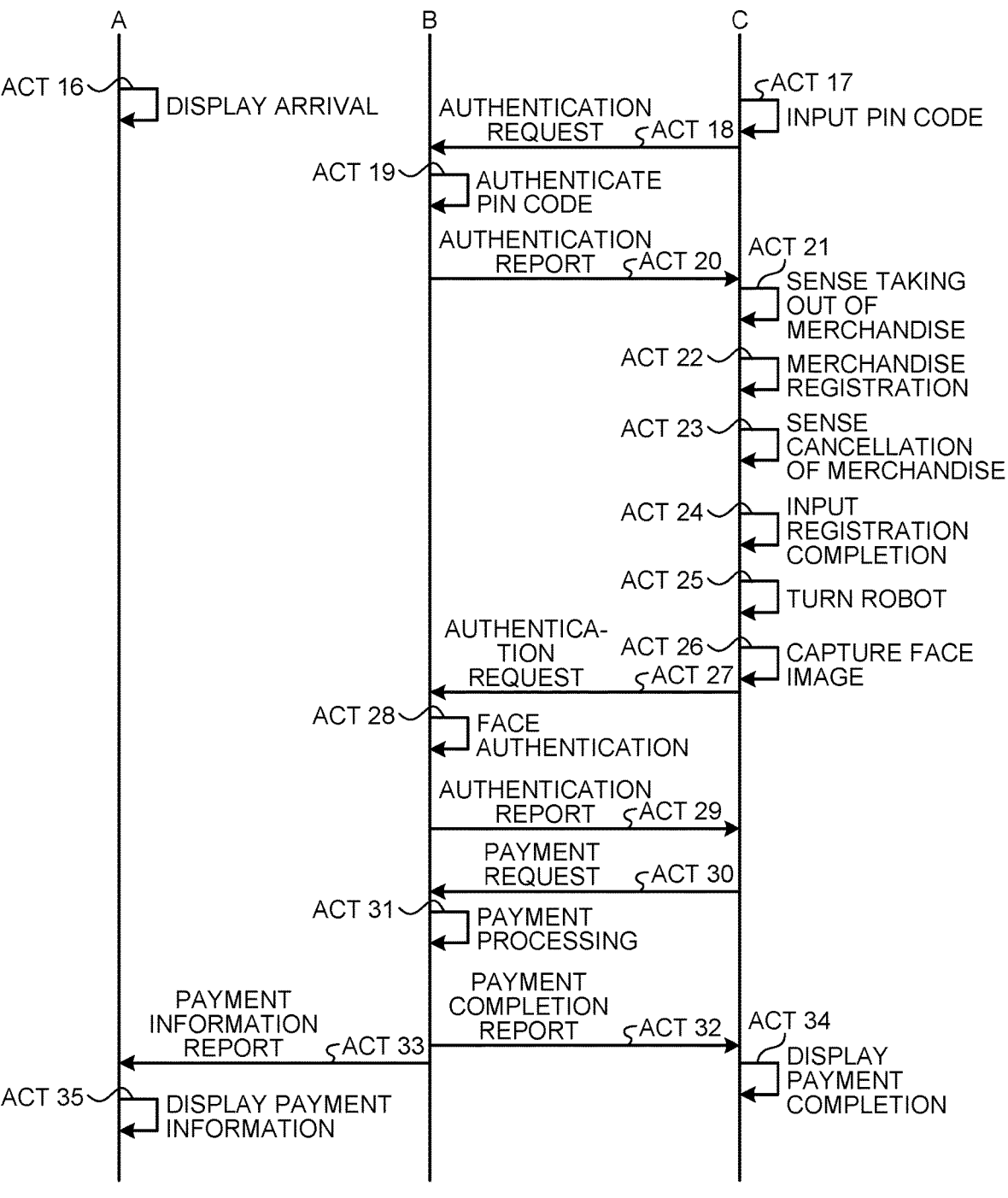

FIGS. 27A and 27B are portions of a sequence chart showing an example of the flow of processing performed by the mobile vending system 1 according to the present embodiment. The sequence chart of FIGS. 27A and 27B depicts a case where the customer checks the merchandise information of the merchandise M contained in the mobile vending robot 10, calls the mobile vending robot 10, and purchases the merchandise M.

The customer activates an application program of the mobile vending system 1 installed in the user terminal 20 for calling the mobile vending robot 10. When the merchandise information request menu is selected, the user terminal 20 displays a current location display window of the mobile vending robot 10 shown in FIG. 19 and receives the selection of the mobile vending robot 10 (Act 1; see FIG. 27A). The user terminal 20 transmits the merchandise information request containing the robot ID of the selected mobile vending robot 10 and the terminal ID of the user terminal 20 to the server apparatus 30 (Act 2).

The server apparatus 30 reads out the merchandise information from the memory section 316 in response to the received merchandise information request (Act 3). Then, the server apparatus 30 transmits the read out merchandise information to the user terminal 20 (Act 4). The communication address of the user terminal 20 may be registered in the user management table 3165 in advance or contained in the merchandise information request.

The user terminal 20 displays the received merchandise information in the display section 215 (Act 5). When checking the displayed merchandise information and finding merchandise to purchase, the customer performs an operation to call the mobile vending robot 10 containing the merchandise. Thereby, the call request is input to the user terminal 20 (Act 6). The user terminal 20 acquires location information of the location where the apparatus itself is present (Act 7) and transmits the call request containing the acquired location information as the call location to the server apparatus 30 (Act 8).

Upon receiving the call request, the server apparatus 30 executes call request reception processing (Act 9). The server apparatus 30 transmits the PIN code issued in the call request reception processing to the user terminal 20 (Act 10). Further, the server apparatus 30 transmits the movement instruction containing the call location to the mobile vending robot 10 designated by the call request (Act 11).

The mobile vending robot 10 controls the drive section 123 to move to the call location designated by the movement instruction (Act 12). When the mobile vending robot 10 arrives at the call location, the mobile vending robot 10 transmits the arrival report to the server apparatus 30 (Act 13). Note that the mobile vending robot 10 may transmit only the location information representing the location where the apparatus itself is present to the server apparatus 30 and the server apparatus 30 may determine the arrival of the mobile vending robot 10 at the call location.

The server apparatus 30 updates the call management table 3166 based on the received arrival report (Act 14). Specifically, the server apparatus 30 registers the arrival time and date of the corresponding call request in the call management table 3166. Then, the server apparatus 30 transmits the arrival report to the user terminal 20 (Act 15).

Upon receiving the arrival report, the user terminal 20 displays information representing the arrival of the called mobile vending robot 10 in the display section 215 (Act 16; see FIG. 27B). Thereby, the customer recognizes the arrival of the mobile vending robot 10 and inputs the PIN code received from the server apparatus 30 to the operation section 156 of the mobile vending robot 10 (Act 17).

Upon receiving the input of the PIN code, the mobile vending robot 10 transmits an authentication request containing the input PIN code and the robot ID to the server apparatus 30 (Act 18).

The server apparatus 30 authenticates the PIN code (Act 19). If authenticating the PIN code and recognizing that a user making the call request and a user to start shopping are the same, the server apparatus 30 transmits an authentication report to the mobile vending robot 10 (Act 20).

Upon receiving the authentication report, the mobile vending robot 10 permits processing relating to selling of the merchandise. Then, if removal of the merchandise from the container section 111 is detected (sensed), the robot executes a merchandise registration for the corresponding removed item of merchandise (Act 22). If the merchandise previously removed (and thus registered) is returned to the rack 112, the mobile vending robot 10 cancels the corresponding merchandise registration (Act 23).

If the registration complete button 47 is detected as being pressed (selected), the mobile vending robot 10 determines that the merchandise registration has been completed (Act 24). Then, the mobile vending robot 10 turns by 90° without a shift in location and turns the second display unit 132 towards the customer (Act 25). Then, the mobile vending robot 10 captures the face image of the customer for customer authentication purposes (Act 26) and transmits the captured face image of the customer to the server apparatus 30 as an authentication request (Act 27).

The server apparatus 30 performs face authentication (Act 28) and, if the authentication is successful, transmits an authentication report to the mobile vending robot 10 (Act 29).

Upon receiving the authentication report, the mobile vending robot 10 transmits the merchandise registration file 1624 to the server apparatus 30 as a payment request (Act 30).

The server apparatus 30 executes the payment processing based on the received payment request (Act 31). If the payment is normally completed in the payment processing, the server apparatus 30 transmits the payment completion report to the mobile vending robot 10 (Act 32). The server apparatus 30 also transmits the payment information representing the details of payment to the user terminal 20 (Act 33).

Upon receiving the payment completion report, the mobile vending robot 10 displays information indicating that the payment has been completed on the second display unit 132 (Act 34).

If receiving the payment information, the user terminal 20 displays the information indicating the details of payment in the display section 215 (Act 35).

Through the above described operation, the mobile vending system 1 moves the mobile vending robot 10 to the location designated by the user and enables selling of the merchandise to the user (customer).

(Flow of Merchandise Registration Processing by Mobile Vending Robot)

Figure 28:
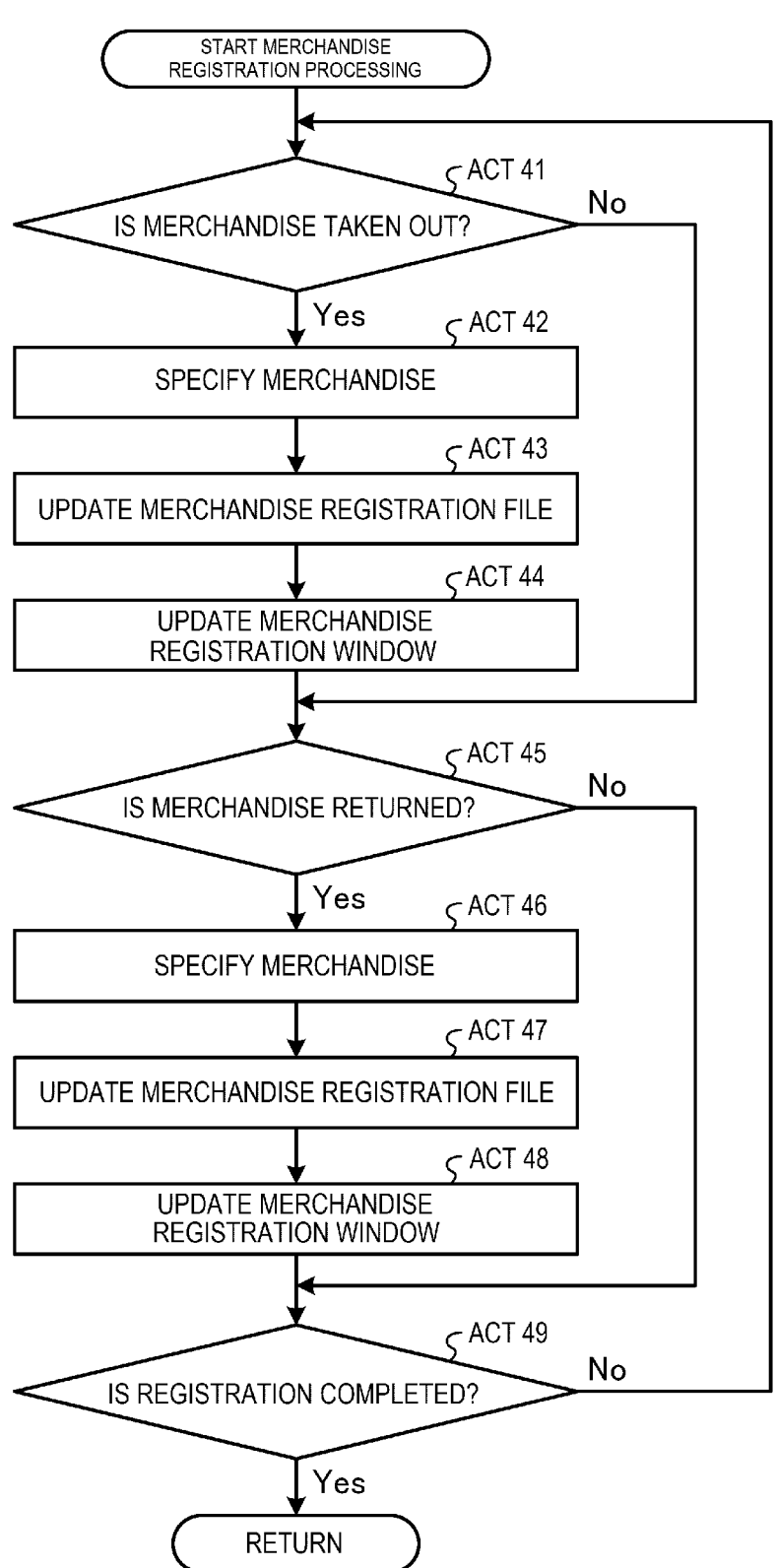
FIG. 28 is a flowchart showing an example of a flow of merchandise registration processing performed by a mobile vending robot.

FIG. 28 is a flowchart showing an example of the flow of merchandise registration processing performed by the mobile vending robot according to an embodiment. Note that the flowchart shown in FIG. 28 shows the details of the flow of the processing performed at Act 21 to Act 24 of FIG. 27B.

The merchandise specification unit 1543 determines whether merchandise M has been taken out from the rack 112 of the container section 111 (Act 41). If merchandise M has been removed from the rack 112 (Act 41: Yes), the processing goes to Act 42. On the other hand, if merchandise M is not removed (Act 41: No), the processing goes to Act 45.

If the taking out of a merchandise M is detected at Act 41, the merchandise specification unit 1543 identifies the taken out item of merchandise M (Act 42).

The merchandise registration unit 1544 adds the information relating to the item of merchandise M identified at Act 42 to the merchandise registration file 1624, and thereby, updates the merchandise registration file 1624 (Act 43).

The display control unit 1551 adds the information relating to the merchandise M identified at Act 42 in the merchandise registration window 40 displayed on the first display unit 131 of the mobile vending robot 10, and thereby, updates the merchandise registration window 40 (Act 44).

If the taking out of the merchandise M is not detected at Act 41 or subsequent to Act 44, the merchandise specification unit 1543 then determines whether merchandise M has been returned to the rack 112 (Act 45). If returning of merchandise M is detected (Act 45: Yes), the processing goes to Act 46. On the other hand, if the returning of merchandise M is not detected (Act 45: No), the processing goes to Act 49.

If the returning of merchandise M is detected at Act 45, the merchandise specification unit 1543 identified the returned merchandise M (Act 46).

The merchandise registration unit 1544 deletes the information relating to the merchandise M specified at Act 46 from the merchandise registration file 1624, and thereby, updates the merchandise registration file 1624 (Act 47).

The display control unit 1551 deletes the information relating to the merchandise M specified at Act 46 from the merchandise registration window 40 displayed on the first display unit 131 of the mobile vending robot 10, and thereby, updates the merchandise registration window 40 (Act 48).

The merchandise registration unit 1544 determines whether all registrations of the merchandise purchased by the customer have been completed (Act 49). If all registrations by the customer have been completed (Act 49: Yes), the mobile vending robot 10 ends the processing in FIG. 28. On the other hand, if the registrations are not yet completed (Act 49: No), the processing returns to Act 41. Note, in this example, whether all registrations of the merchandise to be purchased by the customer have been completed is determined by whether or not the customer has pressed the registration complete button 47.

(Flow of Payment Processing by Mobile Vending System)

Figure 29A:
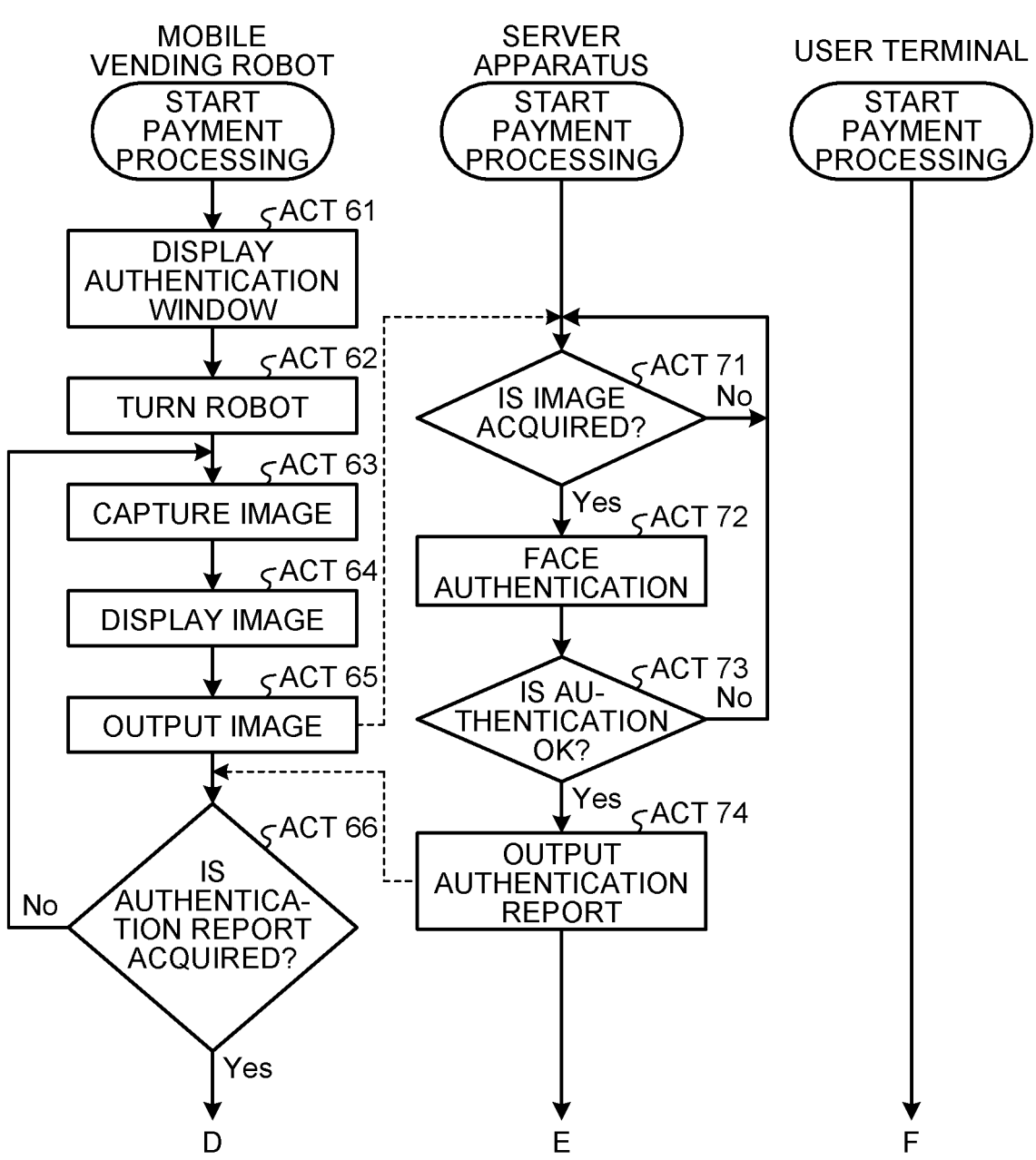
FIGS. 29A and 29B are portions of a flowchart showing an example of a flow of payment processing performed by a mobile vending system.
Figure 29B:
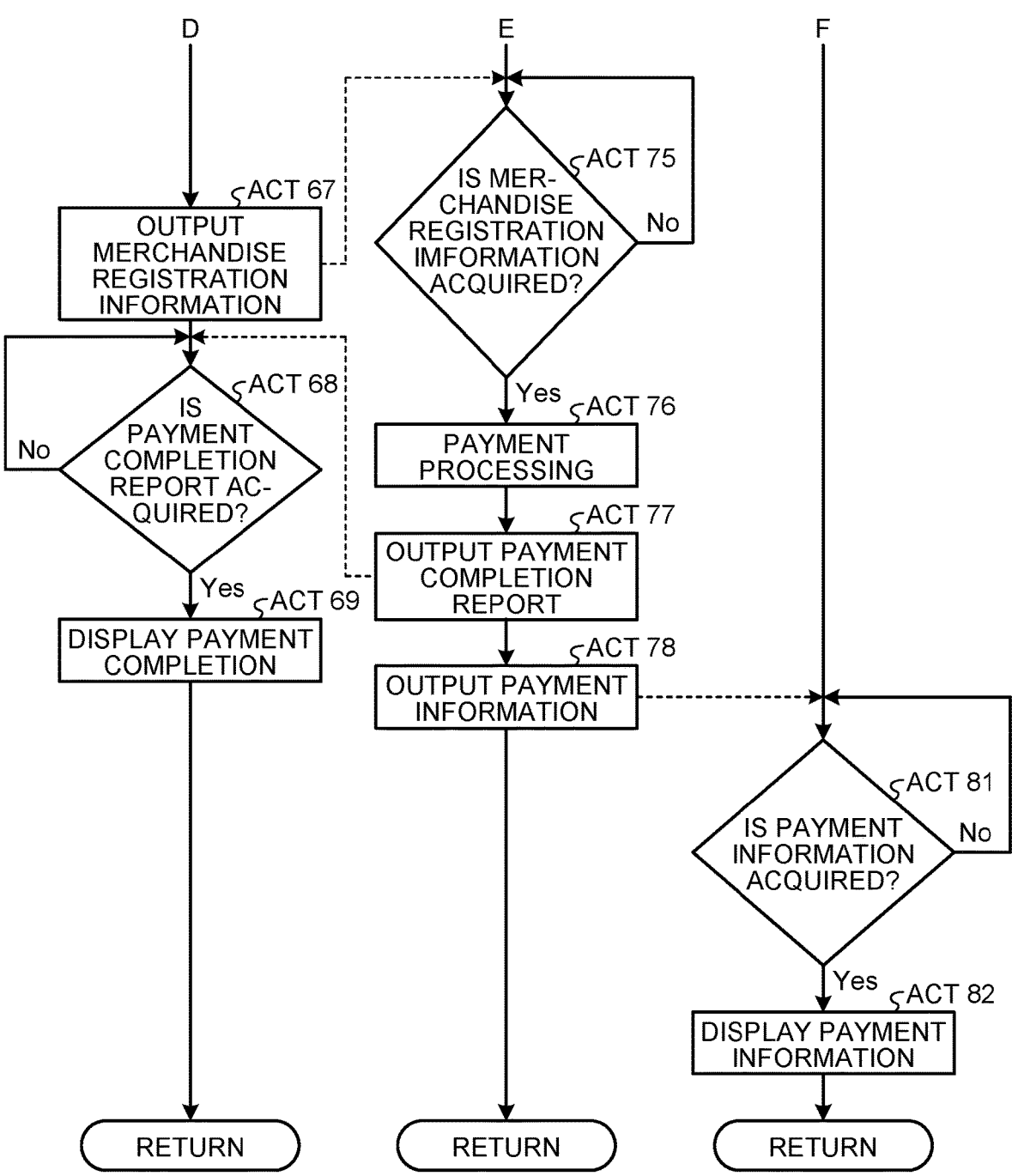

FIGS. 29A and 29B are portions of a flowchart showing an example of the flow of payment processing performed by the mobile vending system 1 according to an embodiment. A flow of the payment processing performed by the mobile vending robot 10, a flow of the payment processing performed by the server apparatus 30, and a flow of the payment processing performed by the user terminal 20 will be explained.

(Flow of Payment Processing by Mobile Vending Robot)

Act 61 to Act 69 of FIGS. 29A and 29B show the flow of the processing performed by the mobile vending robot 10 at Act 25, Act 26, Act 27, Act 29, Act 30, Act 32, Act 34 of FIG. 27B.

The display control unit 1551 displays the authentication window 50 on the second display unit 132 (Act 61).

The robot orientation control unit 1545 turns the mobile vending robot 10 by 90° to set the second display unit 132 to face the customer (Act 62).

The user authentication unit 1546 controls the imaging section 134 to capture image data (Act 63).

The display control unit 1551 displays the image data captured by the imaging section 134 in the authentication window 50 (Act 64).

The user authentication unit 1546 outputs the image data to the server apparatus 30 (Act 65).

The user authentication unit 1546 determines whether or not the authentication report has been acquired from the server apparatus 30 (Act 66). If the authentication report is acquired (Act 66: Yes), the processing goes to Act 67. On the other hand, if the authentication report is not acquired (Act 66: No), the processing returns to Act 63.

If the authentication report is acquired at Act 66, the merchandise registration information output unit 1547 outputs the merchandise registration file 1624 to the server apparatus 30 (Act 67).

The payment completion report acquisition unit 1548 determines whether the payment completion report has been acquired from the server apparatus 30 (Act 68). If the payment completion report is acquired (Act 68: Yes), the processing goes to Act 69. On the other hand, if the payment completion report is not acquired (Act 68: No), the processing repeats Act 68.

If the payment completion report is acquired at Act 68, the display control unit 1551 performs the payment completion display showing that the payment has been completed in the authentication window 50 (Act 69). Then, the mobile vending robot 10 ends the payment processing.

(Flow of Payment Processing by Server Apparatus)

Act 71 to Act 78 of FIGS. 29A and 29B show the details of the flow of the processing performed by the server apparatus 30 at Act 27, Act 28, Act 29, Act 30, Act 31, Act 32, Act 33 of FIG. 27B.

The transmission and reception unit 3141 determines whether the image data has been acquired from the mobile vending robot 10 (Act 71). If the image data is acquired from the mobile vending robot 10 (Act 71: Yes), the processing goes to Act 72. On the other hand, if the image data is not acquired from the mobile vending robot 10 (Act 71: No), the processing repeats Act 71.

If the image data from the mobile vending robot 10 is acquired at Act 71, the checking unit 3143 performs face authentication (Act 72).

The checking unit 3143 determines whether the face authentication is successful (Act 73). If the face authentication is a success (Act 73: Yes), the processing goes to Act 74. On the other hand, if the face authentication is not successful (Act 73: No), the processing returns to Act 71.

If the face authentication is successful at Act 73, the transmission and reception unit 3141 transmits the authentication report to the mobile vending robot 10 that sent the image data (Act 74).

The transmission and reception unit 3141 determines whether the merchandise registration file 1624 has been acquired from the mobile vending robot 10 (Act 75). If merchandise registration file 1624 is acquired (Act 75: Yes), the processing goes to Act 76. On the other hand, if the merchandise registration file 1624 is not acquired (Act 75: No), the processing repeats Act 75.

When the merchandise registration file 1624 is acquired from the mobile vending robot 10 transmitting the authentication report at Act 75, the payment processing unit 3144 performs the payment processing based on the merchandise registration file 1624 (Act 76).

The transmission and reception unit 3141 then transmits the payment completion report to the mobile vending robot 10 (Act 77).

The transmission and reception unit 3141 transmits the payment information representing the details of the payment processing to the user terminal 20 (Act 78). Then, the server apparatus 30 ends the payment processing.

(Flow of Payment Processing by User Terminal)

Act 81 and Act 82 of FIG. 29B show the flow of the processing performed at Act 33 and Act 35 of FIG. 27B by the user terminal 20.

The transmission and reception unit 2141 determines whether the payment information has been acquired from the server apparatus 30 (Act 81). If payment information is acquired (Act 81: Yes), the processing goes to Act 82. On the other hand, if payment information is not acquired (Act 81: No), the processing repeats Act 81.

When the payment information is acquired at Act 81, the display control unit 2144 displays the payment information in the display section 215 (Act 82). Then, the user terminal 20 ends the payment processing.

(Functions and Effects)

The mobile vending robot 10 of the present embodiment includes the merchandise specification unit 1543 for specifying the merchandise M removed from the container section 111 and the merchandise M returned to the container section 111, the merchandise registration unit 1544 for registering the merchandise M identified as removed from the container section 111, the display control unit 1551 (registration result display unit) displaying the information relating to the merchandise M registered by the merchandise registration unit 1544 aligned in rows on the first display unit 131, and the display control unit 1551 (payment processing supporting unit) receiving an indication that the registration of the merchandise has been completed and displaying the information relating to the payment processing on the second display unit 132. Therefore, the registration status of the merchandise to be purchased and the progress status of the payment processing may be displayed in an easy-to-understand way.

In the mobile vending robot 10) of the present embodiment, the display control unit 1551 (registration result display unit) wipes the information relating to the merchandise M in a direction from the container section 111 toward the first display unit 131. Therefore, the customer may be informed about registration of the merchandise to be purchased in an easy-to-understand way.

In the mobile vending robot 10) of the present embodiment, the display control unit 1551 (registration result display unit) wipes the information relating to the merchandise M returned to the container section 111 after a registration event from of the first display unit 131 in a direction from the first display unit 131 toward the container section 111. Therefore, the customer may be informed about the cancelling of a previously registered item of merchandise in an easy-to-understand way.

In the mobile vending robot 10 of the present embodiment, the first display unit 131 and the second display unit 132 are provided on the different surfaces of the mobile vending robot 10. Therefore, the details of the processing being executed by the mobile vending robot 10 are displayed on the screen facing the customer, and the customer may be informed about the operation status of the mobile vending robot 10 in an easy-to-understand way.

MODIFIED EXAMPLES

In an embodiment, the first display unit 131 for displaying the registration information and the second display unit 132 for displaying the information relating to the payment processing are placed on the different surfaces of the mobile vending robot 10, however, the position relationship between the first display unit 131 and the second display unit 132 is not particularly limited.

Figure 30:
FIGS. 30 to 32 showing examples of a display format of merchandise registration information and information relating to payment processing.
Figure 31:
Figure 32:
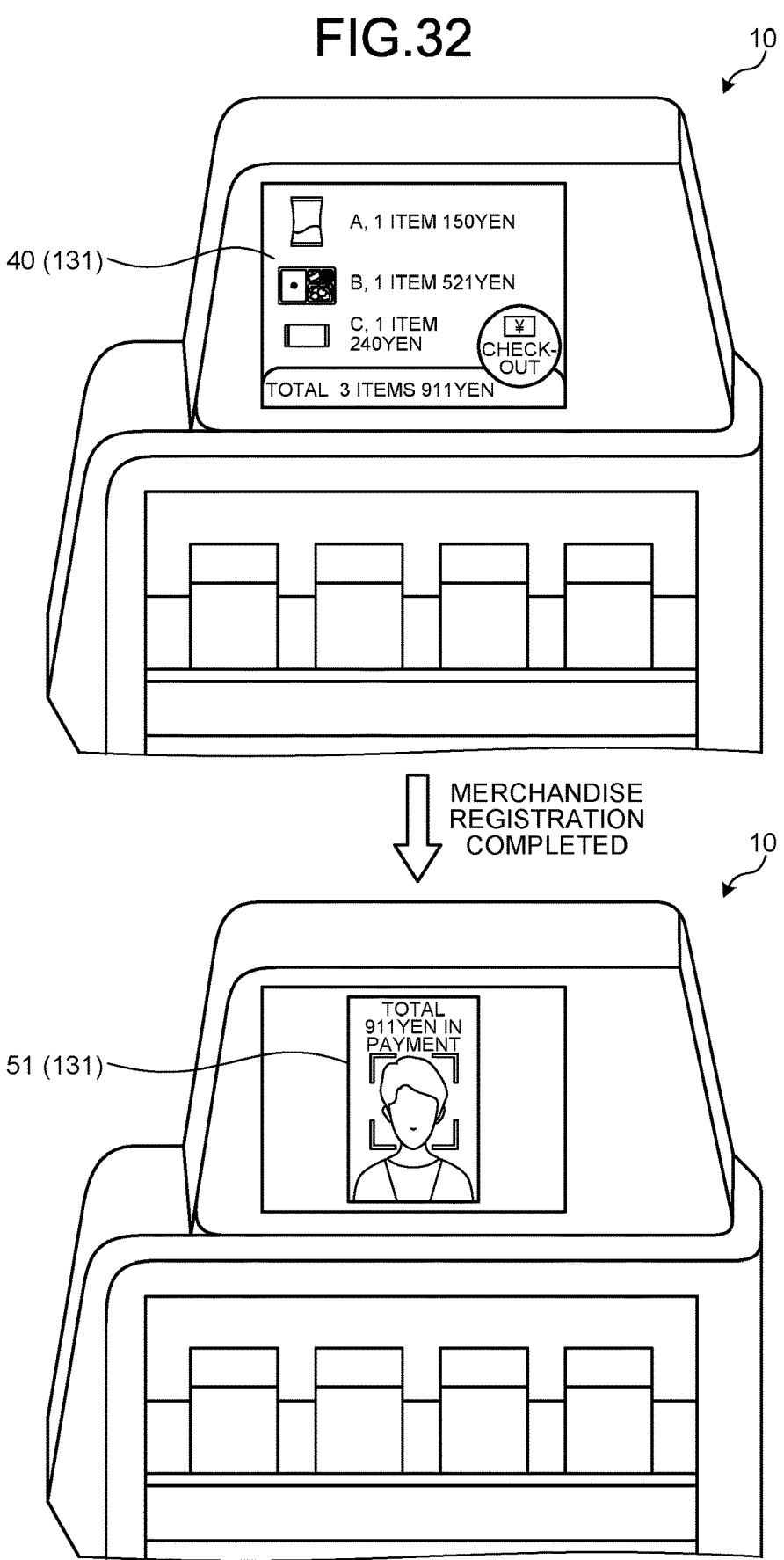

Other position relationships between the first display unit 131 and the second display unit 132 can be used as depicted in FIGS. 30, 31, and 32. FIG. 30 is a first view showing an example of a display format of the merchandise registration information and the information relating to payment processing. FIG. 31 is a second example of the other display format of the merchandise registration information and the information relating to payment processing. FIG. 32 is a third example of the other display format of the merchandise registration information and the information relating to payment processing.

FIG. 30 shows an example in which the merchandise registration window 40 and the authentication window 51 are displayed on the same first display unit 131. In this manner, the information relating to the payment processing displayed on the second display unit 132 is displayed in a part of the first display unit 131 displaying the merchandise registration window 40, and thereby, the customer may easily and reliably recognize the operation status of the mobile vending robot 10. Note that, according to the configuration in FIG. 30, the second display unit 132 is unnecessary. Only the display location of the authentication window 51 is changed, and the flow of the merchandise registration processing (FIG. 28) and flow of the payment processing (FIGS. 29A and 29B) are unchanged.

FIG. 31 shows an example in which the first display unit 131 displaying the merchandise registration window 40 and the second display unit 132 displaying the authentication window 51 relating to the payment processing are placed adjacent to each other on the same surface of the mobile vending robot 10. The display format is employed, and thereby, the customer may easily and reliably recognize the operation status of the mobile vending robot 10. Note that only the display location of the authentication window 51 is changed, and the flow of the merchandise registration processing (FIG. 28) and flow of the payment processing (FIGS. 29A and 29B) are unchanged.

FIG. 32 shows an example in which the merchandise registration window 40 and the authentication window 51 are switched and displayed. That is, when detecting the completion of the merchandise registration, the mobile vending robot 10 erases the merchandise registration window 40 displayed on the first display unit 131 and displays the authentication window 51 on the first display unit 131. The display format is employed, and thereby, the customer may easily and reliably recognize the operation status of the mobile vending robot 10. Note that only the display location of the authentication window 51 is changed, and the flow of the merchandise registration processing (FIG. 28) and flow of the payment processing (FIGS. 29A and 29B) are unchanged.

(Functions and Effects of Modified Examples of Embodiment)

In a mobile vending robot 10 of the modified example, the information otherwise displayed on the second display unit 132 is displayed in a part of the first display unit 131. Therefore, the customer may easily and reliably recognize the operation status of the mobile vending robot 10.

The mobile vending robot 10 of the modified example, the first display unit 131 and the second display unit 132 can be provided adjacent to each other. Therefore, the customer may easily and reliably recognize the operation status of the mobile vending robot 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vending apparatus, comprising:
   a movement mechanism to permit the vending apparatus to rotate;
   a communication interface configured to connect to a server device;
   a container section for storing items of merchandise;
   a sensor device configured to detect a removal of an item of merchandise from the container section and a return of the item of merchandise to the container section;
   a first display screen to display information to a user, the first display screen facing a first direction;
   a second display screen to display information to the user, the second display screen facing a second direction different from the first direction; and
   a processor configured to:
      identify the item of merchandise removed from the container section based on output from the sensor device;
      register the identified item of merchandise on a transaction list;
      cause the first display screen to display information relating to the registered item of merchandise; and
      receive an indication that registration of items has been completed by the user and then display information relating to payment processing on the second display screen and cause the movement mechanism to rotate the vending apparatus so that the second display screen faces the user.

2. The vending apparatus according to claim 1, wherein the processor is further configured to cause information relating to the registered item of merchandise to be added to a list displayed on the first display screen in a wipe in manner indicating movement of the information in a direction from the container section towards the first display screen before being added to a row of the list.

3. The vending apparatus according to claim 1, wherein the processor is further configured to:
   identify the item merchandise being returned to the container section based on output from the sensor device; and
   remove the information relating to the item of merchandise returned to the container section from the list on the first display screen in a wipe out manner indicating movement of the information relating to the item of merchandise in a direction from the first display screen toward the container section.

4. The vending apparatus according to claim 1, wherein the first display screen and the second display screen are provided at a substantially 90 degree angle to one another.

5. The vending apparatus according to claim 1, wherein the movement mechanism is under the container section and configured to move the vending apparatus from location to location, wherein
   the processor is further configured to control the movement mechanism to move the vending apparatus to a location selected by the server device.

6. The vending apparatus according to claim 5, further comprising:
   a positioning section configured to provide location information to the processor.

7. The vending apparatus according to claim 1, wherein the information relating to the registered item of merchandise is supplied from the server device.

8. The vending apparatus according to claim 1, wherein the movement mechanism includes a wheeled base unit.

9. The vending apparatus according to claim 1, further comprising:
   a camera facing the second direction, wherein
   the payment processing includes facial image recognition using an image of the user captured by the camera.

10. A mobile vending robot, comprising:
   a mobile base unit;
   a communication interface configured to connect to a server device;
   a container section on the mobile base unit, the container section being configured for storing items of merchandise;
   a sensor device configured to detect a removal of an item of merchandise from the container section and a return of the item of merchandise to the container section;
   a first display screen to display information to a user;
   a second display screen to display information to the user; and
   a processor configured to:
      identify the item of merchandise removed from the container section based on output from the sensor device;
      register the identified item of merchandise on a transaction list;
      cause the first display screen to display information relating to the registered item of merchandise; and
      receive an indication that registration of items has been completed by the user and then display information relating to payment processing on the second display screen, wherein
   the first and second display screens face different directions, and the processor is further configured to control the mobile base unit to rotate to cause the second display screen to face the user when the indication that registration of items has been completed by the user is received.

11. The mobile vending robot according to claim 10, wherein the processor is further configured to cause information relating to the registered item of merchandise to be added to a list displayed on the first display screen in a wipe in manner indicating movement of the information in a direction from the container section towards the first display screen before being added to a row of the list.

12. The mobile vending robot according to claim 10, wherein the processor is further configured to:

identify the item merchandise being returned to the container section based on output from the sensor device; and remove the information relating to the item of merchandise returned to the container section from the list on the first display screen in a wipe out manner indicating movement of the information relating to the item of merchandise in a direction from the first display screen toward the container section.

13. The mobile vending robot according to claim 10, wherein the first display screen and the second display screen are provided at a substantially 90 degree angle to one another.

14. The mobile vending robot according to claim 10, further comprising:

a positioning sensor configured to provide location information to the processor.

15. The mobile vending robot according to claim 10, wherein the mobile base unit includes a drive wheel and a plurality of non-drive wheels.

16. The mobile vending robot according to claim 10, further comprising:

a camera facing the second direction, wherein the payment processing includes facial image recognition using an image of the user captured by the camera.

17. A mobile vending robot, comprising:

a wheeled base unit;

a communication interface configured to connect to a server device;

a container section on the wheeled base unit, the container section being configured for storing items of merchandise;

a weighing device configured to detect a removal of an item of merchandise from the container section and a return of the item of merchandise to the container section;

a first display screen facing in a first direction to display information to a user standing before an opening in the container section;

a second display screen facing in a second direction to display information to the user during payment processing operations;

a camera facing in the second direction; and a processor configured to:

identify the item of merchandise removed from the container section based on output from the weighing device;

register the identified item of merchandise on a transaction list;

cause the first display screen to display information relating to the registered item of merchandise on the first display screen; and receive an indication that registration of items has been completed by the user and then display information relating to payment processing on the second display screen, wherein the processor is further configured to:

cause information relating to the registered item of merchandise to be added to a list displayed on the first display screen in a wipe in manner indicating movement of the information in a direction from the container section towards the first display screen before being added to a row of the list, and control the wheeled base unit to rotate to cause the second display screen to face the user when the indication that registration of items has been completed by the user is received.

18. The mobile vending robot according to claim 17, wherein the wheeled base unit includes a drive wheel and a plurality of non-drive wheels.

19. The mobile vending robot according to claim 17, wherein the payment processing operations includes facial image recognition using an image of the user captured by the camera.

20. The mobile vending robot according to claim 17, further comprising:

a positioning sensor configured to provide location information to the processor.

* * * * *